US010533525B2

(12) United States Patent
Seo

(10) Patent No.: US 10,533,525 B2
(45) Date of Patent: Jan. 14, 2020

(54) HEAT EXCHANGER FOR VEHICLE

(71) Applicants: HYUNDAI MOTOR COMPANY, Seoul (KR); KIA MOTORS CORPORATION, Seoul (KR)

(72) Inventor: Jung Min Seo, Gwangmyeong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 282 days.

(21) Appl. No.: 15/641,920

(22) Filed: Jul. 5, 2017

(65) Prior Publication Data
US 2018/0163672 A1    Jun. 14, 2018

(30) Foreign Application Priority Data

Dec. 14, 2016   (KR) .................. 10-2016-0170211

(51) Int. Cl.
*F02M 25/022* (2006.01)
*F02M 26/30* (2016.01)
*F02M 26/32* (2016.01)
*F02M 26/33* (2016.01)
*F01K 23/10* (2006.01)
*F01N 5/02* (2006.01)

(52) U.S. Cl.
CPC .............. *F02M 26/30* (2016.02); *F01K 23/10* (2013.01); *F01N 5/02* (2013.01); *F02M 26/32* (2016.02); *F02M 26/33* (2016.02)

(58) Field of Classification Search
CPC ...... F01N 5/02; F02M 26/22–26; F02M 26/30; F02M 26/35; F02M 26/31; F02M 26/32; F02M 26/33; F02G 5/02; F01K 23/10
See application file for complete search history.

(56) References Cited

U.S. PATENT DOCUMENTS

| 4,201,262 A | 5/1980 | Goldstein |
| 4,492,186 A | 1/1985 | Helm |
| 4,905,900 A | 3/1990 | Scharton et al. |
| 4,966,230 A | 10/1990 | Hughes et al. |
| 6,250,379 B1 | 6/2001 | Geissler et al. |
| 7,044,207 B1 | 5/2006 | Guidat et al. |

(Continued)

FOREIGN PATENT DOCUMENTS

| DE | 3706527 A1 | 9/1988 | |
| DE | 10350521 A1 * | 6/2005 | .............. F28F 27/02 |

(Continued)

OTHER PUBLICATIONS

Machine generated translation of WO2013151079.*

(Continued)

*Primary Examiner* — Ngoc T Nguyen
(74) *Attorney, Agent, or Firm* — Morgan, Lewis & Bockius LLP

(57) ABSTRACT

A heat exchanger for a vehicle includes a housing having an interior space through which exhaust gas recirculation (EGR) gas passes, a first heat exchange core disposed in the interior space of the housing, a second heat exchange core disposed in the interior space of the housing and disposed on a downstream side of the first heat exchange core, and a bypass valve configured to allow the EGR gas to selectively detour the second heat exchange core.

14 Claims, 21 Drawing Sheets

(56) References Cited

U.S. PATENT DOCUMENTS

| | | | |
|---|---|---|---|
| 7,287,378 B2 * | 10/2007 | Chen | F02M 26/43 |
| | | | 123/568.12 |
| 8,596,339 B2 | 12/2013 | Palanchon | |
| 2007/0017489 A1 * | 1/2007 | Kuroki | F02M 26/25 |
| | | | 123/568.12 |
| 2009/0056909 A1 * | 3/2009 | Braun | F28D 7/1684 |
| | | | 165/54 |
| 2009/0260605 A1 * | 10/2009 | Janssen | F28F 27/02 |
| | | | 123/568.12 |
| 2009/0277606 A1 | 11/2009 | Reiss, III et al. | |
| 2011/0203781 A1 | 8/2011 | Ellingwood et al. | |
| 2012/0117989 A1 | 5/2012 | Turney et al. | |
| 2013/0205776 A1 * | 8/2013 | Yin | F01K 25/10 |
| | | | 60/615 |
| 2013/0244077 A1 | 9/2013 | Palanchon et al. | |
| 2014/0017545 A1 | 1/2014 | Palanchon | |
| 2014/0076528 A1 | 3/2014 | Daly et al. | |
| 2014/0373798 A1 | 12/2014 | Alfano et al. | |
| 2015/0226143 A1 * | 8/2015 | Iwai | F02B 23/101 |
| | | | 123/294 |
| 2016/0138429 A1 * | 5/2016 | Son | F01D 17/085 |
| | | | 60/645 |
| 2016/0138430 A1 * | 5/2016 | Son | F01K 23/10 |
| | | | 60/618 |
| 2017/0198665 A1 * | 7/2017 | Kuske | F02M 26/25 |
| 2017/0306897 A1 * | 10/2017 | Nam | F02M 26/24 |

FOREIGN PATENT DOCUMENTS

| | | | | |
|---|---|---|---|---|
| DE | 102007002459 A1 * | 7/2007 | | F01N 3/043 |
| EP | 3284925 A1 * | 2/2018 | | F02M 26/28 |
| FR | 2905735 A1 * | 3/2008 | | F02M 26/26 |
| FR | 2925351 A1 * | 6/2009 | | F02B 29/0462 |
| FR | 2930280 A1 * | 10/2009 | | F01N 3/0205 |
| FR | 2938321 A1 * | 5/2010 | | F01N 5/00 |
| JP | 5896484 B2 | 3/2016 | | |
| KR | 10-0925816 B1 | 11/2009 | | |
| WO | WO-2013151079 A1 * | 10/2013 | | F02G 5/02 |

OTHER PUBLICATIONS

U.S. Non-Final Office Action dated Aug. 27, 2018 issued in U.S. Appl. No. 15/633,217.

Notice of Allowance issued in related U.S. Appl. No. 15/612,055 dated May 8, 2019.

* cited by examiner

HEAT EXCHANGER FOR VEHICLE

CROSS-REFERENCE TO RELATED APPLICATION

This application is based on and claims the benefit of priority to Korean Patent Application No. 10-2016-0170211, filed on Dec. 14, 2016, with the Korean Intellectual Property Office, the disclosure of which is incorporated herein in its entirety by reference.

TECHNICAL FIELD

The present disclosure relates to a heat exchanger for a vehicle, and more particularly, to a heat exchanger for a vehicle that may efficiently use exhaust gas recirculation (EGR) gas.

BACKGROUND

In general, exhaust gases of a vehicle contain a large amount of harmful substances, such as carbon monoxide, nitrogen oxides, and hydrocarbon. In particular, an amount of harmful substances, such as nitrogen oxides, etc., increases as temperature of an engine becomes higher. In order to reduce the amount of the harmful substances, an exhaust gas recirculation (EGR) system may be used since it decreases combustion temperature in a cylinder by recirculating the exhaust gases to an intake system. Further, an EGR cooler for cooling the exhaust gases of high temperature with a coolant fluid may be installed in the EGR system.

Further, a large amount of heat in the engine of the vehicle is generally discharged as waste heat, and a waste heat recovery system by converting waste heat to usable energy has been developed for increasing efficiency of the engine. The waste heat recovery system is configured to collect waste heat discharged from the engine and convert the collected waste heat to electrical energy or mechanical energy which may be used for the engine or other accessories of the vehicle.

Particular for a commercial vehicle, EGR gas of the EGR system may be utilized as an important heat source of a waste heat recovery system, an EGR gas boiler for heating a working fluid with waste heat of the EGR gas may be installed in a Rankine cycle of the waste heat recovery system.

An EGR gas boiler may be a cooler for cooling the EGR gas. When a volume and/or an installation location of the EGR gas boiler are designed, an EGR cooler needs to be considered. For example, because it is difficult to obtain a target cooling temperature (e.g., less than approximately 140° C.) only with an EGR gas boiler, it is necessary to have an EGR cooler such that the EGR cooler is adjacent to the EGR gas boiler.

In addition, it is necessary to maintain the EGR cooler in order to cope with a situation, such as an initial driving stage of the vehicle, a breakdown of the waste heat recovery system, or the like.

SUMMARY

The present disclosure provides a heat exchanger for a vehicle that may convert a flow direction of exhaust gas recirculation (EGR) gas based on a driving condition or an exterior temperature of a vehicle to efficiently use the EGR gas.

The technical objects of the present disclosure are not limited to the above-mentioned one, and the other unmentioned technical objects will become apparent to those skilled in the art from the following description.

In accordance with an aspect of the present disclosure, there is provided a heat exchanger for a vehicle including a housing having an interior space through which exhaust gas recirculation (EGR) gas passes; a first heat exchange core disposed in the interior space of the housing; a second heat exchange core disposed in the interior space of the housing and disposed on a downstream side of the first heat exchange core; and a bypass valve configured to allow the EGR gas to selectively detour the second heat exchange core.

The first heat exchange core and the second heat exchange core may be disposed in the housing along a flow direction of the EGR gas.

A spacing space may be formed between a downstream end of the first heat exchange core and an upstream end of the second heat exchange core.

A bypass conduit may be connected to the spacing space, and the bypass valve may be installed in the bypass conduit.

A temperature sensor may be installed in the spacing space.

The bypass valve may be configured to move selectively to a first location where the EGR gas passes through the bypass conduit, a second location where the EGR gas passes through the second heat exchange core, and a third location where the EGR gas is interrupted from being supplied to an engine.

The first heat exchange core may be an EGR gas boiler through which a working fluid of a Rankine cycle of a waste heat recovery system circulates.

The first heat exchange core may be connected to a first header, and the first header may be configured to close a first opening formed in the housing.

The first header may include an EGR gas inlet manifold through which the EGR gas is introduced, a working fluid inlet manifold through which the working fluid is introduced, and a working fluid outlet manifold through which the working fluid is discharged.

The first heat exchange core may include a plurality of first core elements, each of which has a passage through which the working fluid circulates, and a plurality of first EGR gas passages, through which the EGR gas passes, may be formed as the plurality of first core elements are spaced apart from each other.

A gas leakage detecting sensor configured to detect leakage of the working fluid may be installed at a location adjacent to an outlet port of the housing.

The second heat exchange core may be an EGR cooler, to which a coolant conduit through which coolant fluid circulates is connected.

The second heat exchange core may be connected to a second header, and the second header may be configured to close a second opening formed in the housing.

The second header may include a coolant inlet manifold, through which the coolant fluid is introduced, and a coolant outlet manifold through which the coolant fluid is discharged.

The second heat exchange core may include a plurality of second core elements, each of which has a passage through which the coolant fluid circulates, and a plurality of second EGR gas passages, through which the EGR gas passes, may be formed as the plurality of second core elements are spaced apart from each other.

An axis of the first heat exchange core may be perpendicular to an axis of the second heat exchange core.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. For reference, the sizes of the components and the thickness of the lines of the drawings may be rather exaggerated for convenience of understanding. Further, the terms used in the description of the present disclosure may be different according to the users, the intentions of the operators, or the customs in consideration of the functions in the present disclosure. Therefore, definition of the terms should be made according to the overall disclosure set forth herein.

Figure 1:
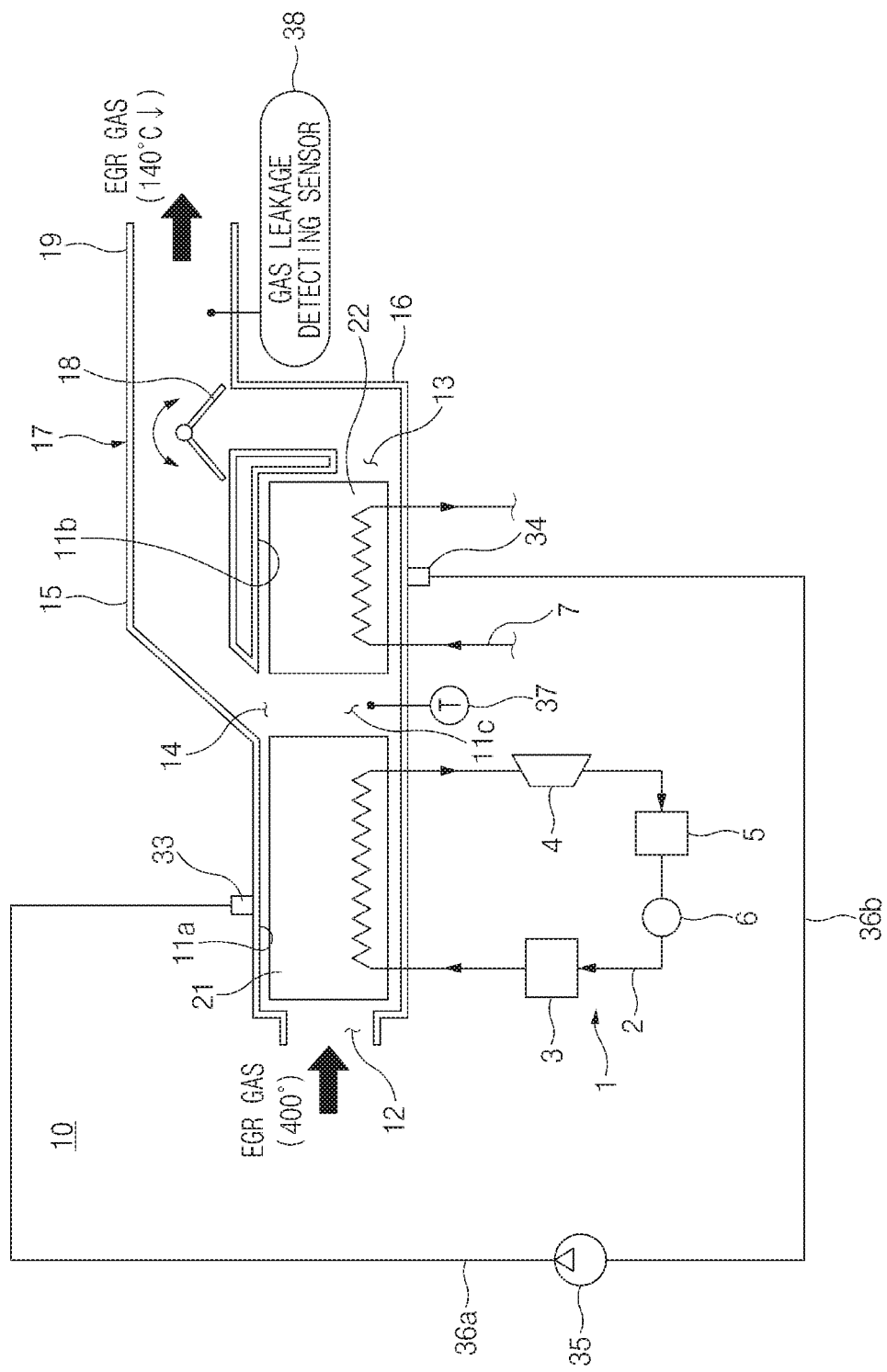
FIG. 1 is a diagram illustrating a heat exchanger for a vehicle according to an embodiment of the present disclosure.

Referring to FIG. 1, a heat exchanger 10 for a vehicle according to an embodiment of the present disclosure may include a housing 11 having interior spaces 11a, 11b, and 11c, through which exhaust gas recirculation (EGR) gas passes, and a first heat exchange core 21 and a second heat exchange core 22 installed in an interior of the housing 11 to be spaced apart from each other.

The housing 11 may have the interior spaces 11a, 11b, and 11c, through which the EGR gas passes, and the first heat exchange core 21 and the second heat exchange core 22 may be disposed in the interior spaces 11a, 11b, and 11c of the housing 11 in a row along a flow direction of the EGR gas.

The housing 11 may have an inlet port 12, through which the EGR gas is introduced, an outlet port 13, through which the EGR gas is discharged, and a bypass port 14, through which the EGR gas detours the second heat exchange core 22 is discharged.

According to an embodiment of the present disclosure, the housing 11 may be installed on an EGR conduit of an EGR system to cool the EGR gas. Accordingly, an upstream side pipe of the EGR conduit may be connected to the inlet port 12 of the housing 11, and the upstream side pipe of the EGR conduit may be connected to an exhaust manifold of an engine such that the EGR gas discharged from the exhaust manifold of the engine may be introduced into the inlet port 12 via the upstream side pipe of the EGR conduit.

A connection conduit 16 may be connected to the outlet port 13, and a bypass conduit 15 may be connected to the bypass port 14. A merging part 17 may be formed at a portion where the connection conduit 16 and the bypass conduit 15 merge, and a bypass valve 18 may be installed in the interior of the merging part 17 to be rotatable. A downstream side pipe 19 of the EGR conduit may be connected to the merging part 17, a downstream portion of the EGR conduit may be connected to the downstream side pipe 19, the downstream portion of the EGR conduit may be connected to an intake manifold of the engine such that the EGR gas discharged through the downstream side pipe 19 of the housing 11 may be introduced into the intake manifold of the engine.

The first heat exchange core 21 may be disposed in the upstream side interior space 11a of the housing 11, and the second heat exchange core 22 may be disposed in the downstream side interior space 11b of the housing 11.

The first heat exchange core 21 and the second heat exchange core 22 may be spaced apart from each other, and accordingly, a spacing space 11c may be formed between the first heat exchange core 21 and the second heat exchange core 22, and as the bypass port 14 is formed at a location facing the spacing space 11c, the bypass port 14 may communicate with the spacing space 11c. The bypass conduit 15 may be connected to the bypass port 14 of the housing 11.

The bypass conduit 15 and the connection conduit 16 may merge at the merging part 17, and the merging part 17 may have an opening communicating with the connection conduit 16, an opening communicating with the bypass conduit 15, and an opening communicating with the downstream side pipe 19 of the EGR conduit. Accordingly, the bypass conduit 15 may connect an upstream end of the second heat exchange core 22 and a downstream end of the second heat exchange core 22 through the connection conduit 16 and the merging part 17. The bypass valve 18 may be installed in the merging part 17, and the bypass valve 18 may be configured to allow the second heat exchange core 22 to selectively detour.

According to an embodiment of the present disclosure, the bypass valve 18 may be configured to selectively move to a first location where the EGR gas passes through the bypass conduit 15, a second location where the EGR gas passes through the second heat exchange core 22, and a third location where the EGR gas is interrupted from being supplied to the engine.

The first location, the second location, and the third location will be described in detail with reference to FIGS. 19, 20, and 21.

Figure 19:
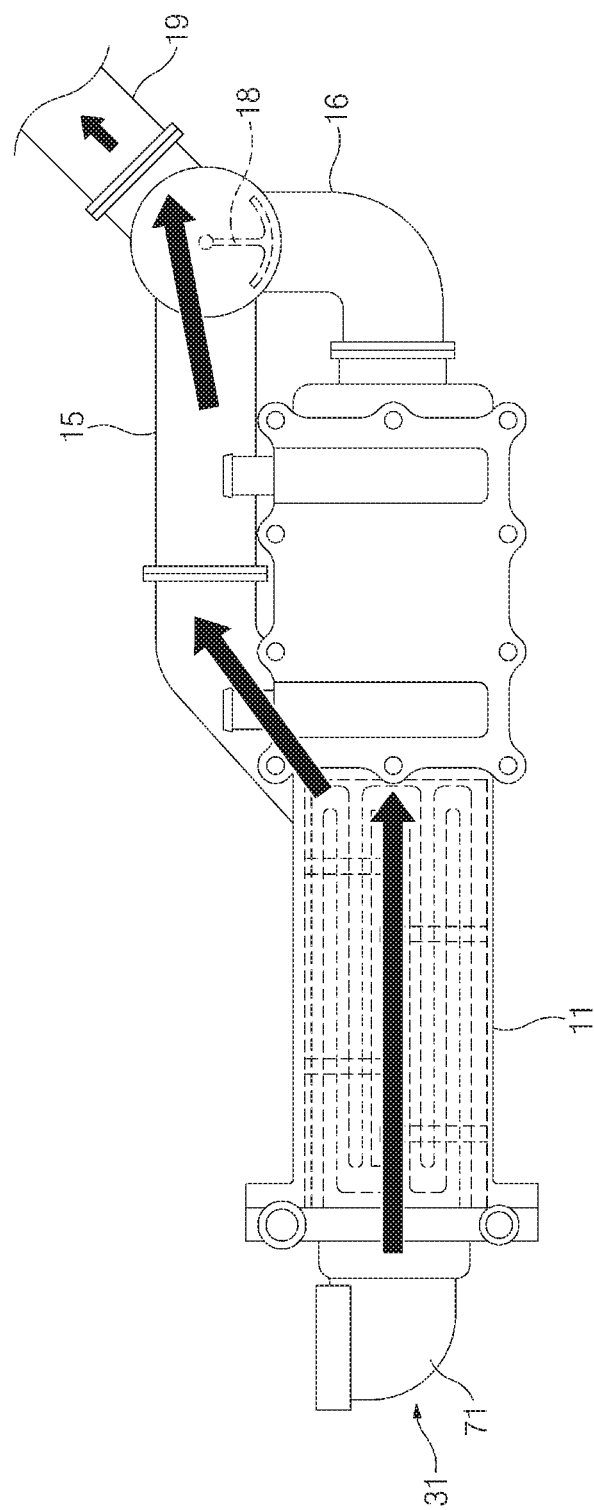
FIG. 19 is a perspective view illustrating a first operation state of the heat exchanger for a vehicle according to an embodiment of the present disclosure.

The first location is a location where the downstream end of the second heat exchange core 22 is closed as illustrated in FIG. 19, and the EGR gas that passed through the first heat exchange core 21 may be supplied to the intake manifold of the engine via the bypass conduit 15 as the downstream end of the second heat exchange core 22 is closed if the bypass valve 18 is moved to the first location.

Figure 20:
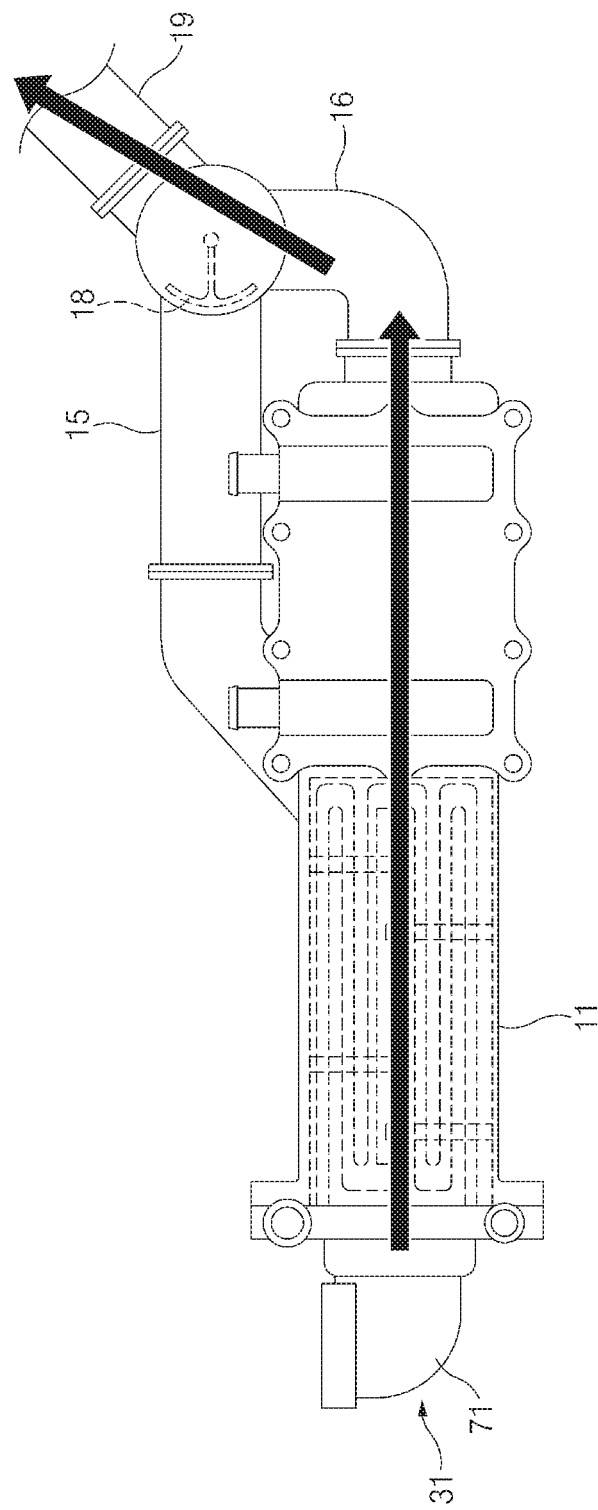
FIG. 20 is a perspective view illustrating a second operation state of the heat exchanger for a vehicle according to an embodiment of the present disclosure.

The second location is a location where the bypass conduit 15 is closed as illustrated in FIG. 20, and the EGR gas that passed through the first heat exchange core 21 may be supplied to the intake manifold of the engine via the second heat exchange core 22 as the bypass conduit 15 is closed if the bypass valve 18 is moved to the second location.

Figure 21:
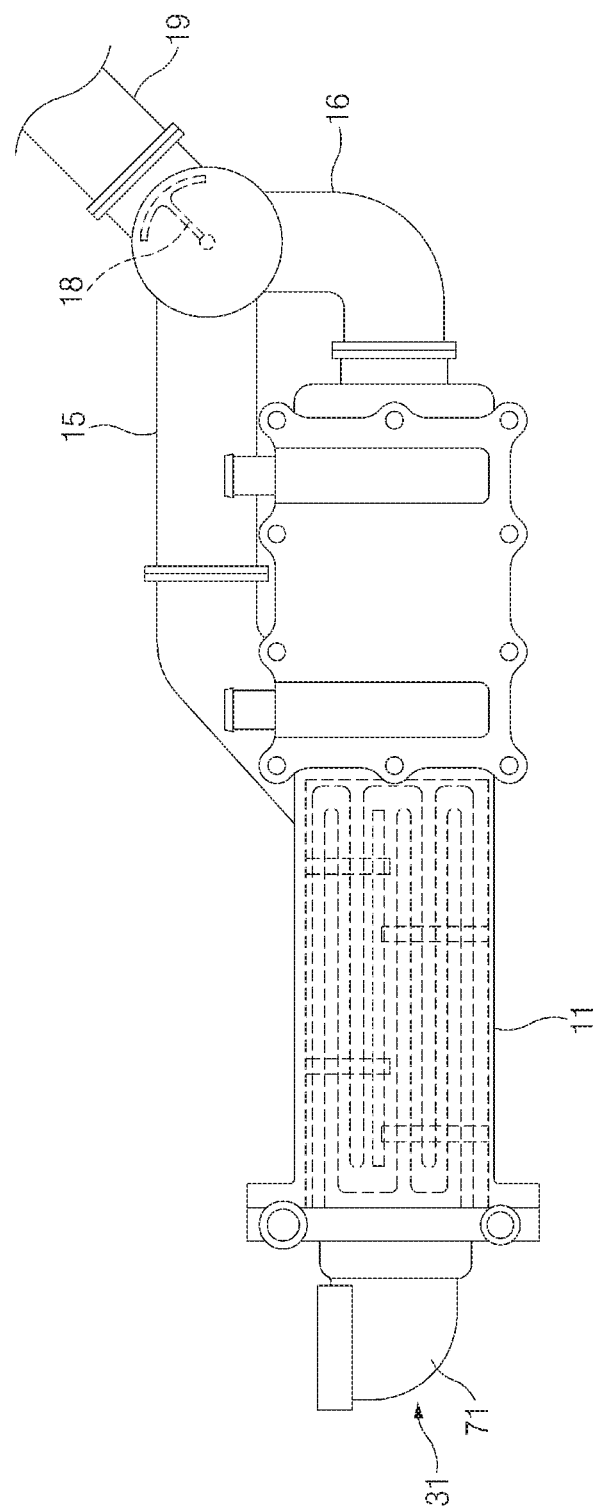
FIG. 21 is a perspective view illustrating a third operation state of the heat exchanger for a vehicle according to an embodiment of the present disclosure.

The third location is a location where the downstream side pipe 19 is closed as illustrated in FIG. 21, and the EGR gas cannot be supplied to the intake manifold of the engine as the downstream side pipe 19 connected to the intake manifold of the engine is closed if the bypass valve 18 is moved to the third location.

The first heat exchange core 21 according to an embodiment of the present disclosure may be an EGR gas boiler, through which a working fluid of a Rankine cycle 1 of a waste heat recovery system passes.

As illustrated in FIG. 1, the Rankine cycle 1 may include a working fluid conduit 2 through which the working fluid circulates, an exhaust gas boiler 3 installed in an exhaust pipe of the engine to heat and evaporate the working fluid by heat of the exhaust gas discharged from the engine, an expander 4 configured to expand the gas phase working fluid received from the exhaust gas boiler 3 to generate rotational energy, a condenser 5 configured to condense the working fluid discharged from the expander 4, and a circulation pump 6 configured to circulate the working fluid on a working fluid conduit 2.

According to an embodiment of FIG. 1, the first heat exchange core 21 may be an EGR boiler disposed between the exhaust gas boiler 3 and the expander 4. Accordingly, the EGR gas may heat the working fluid while passing through the first heat exchange core 21, and through this, the EGR gas may be cooled.

As illustrated in FIG. 1, a coolant fluid conduit 7, in which coolant fluid circulates, may be connected to the second heat exchange core 22, and the coolant fluid for cooling the engine may circulate in the coolant fluid conduit 7.

According to an embodiment of FIG. 1, the second heat exchange core 22 may be an EGR cooler, to which the coolant fluid conduit 7 in which the coolant fluid circulates is connected. The EGR gas passing through the second heat exchange core 22 may be cooled by the coolant fluid passing through the coolant fluid conduit 7. The coolant fluid that passed through the coolant fluid conduit 7 may be cooled by the engine cooling fan.

Basically, the heat exchanger such as the first heat exchange core 21 and the second heat exchange core 22 may act as a resistant factor to the flow of the EGR gas, and in particular, excessive electric power of the cooling fan of the engine may be consumed to cool the coolant fluid passing through the coolant fluid conduit 7 of the second heat exchange core 22. Accordingly, the flow resistance of the EGR gas and the waste of electric power may be reduced by cooling the EGR gas only with the first heat exchange core 21. For example, if the bypass valve 18 is moved to the second location (see FIG. 19) where the downstream end of the second heat exchange core 22 is closed in a low load condition of the engine or at a low exterior temperature, the EGR gas may bypass (detour) the second heat exchange core 22 as the EGR gas passes through the bypass conduit 15 after passing through the first heat exchange core 21.

Because the temperature of the EGR gas introduced through the inlet of the housing 11 is about 400° C. in a high load condition of the engine or at a high exterior temperature, the EGR gas may sequentially pass through the first heat exchange core 21 and the second heat exchange core 22 if the bypass valve 18 is moved to the second location (see FIG. 20) where the bypass conduit 15 is closed such that the EGR gas is properly cooled, and accordingly, the target cooling temperature of the EGR gas may be lowered to not more than 140° C.

A temperature sensor 37 may be installed at a downstream end of the first heat exchange core 21, in particular, in the spacing space 11c between the first heat exchange core 21 and the second heat exchange core 22, and a control unit (not illustrated) may be connected to the temperature sensor 37.

The temperature of the EGR gas that passed through the first heat exchange core 21 may be monitored by the temperature sensor 37 and the control unit (not illustrated), and the control unit (not illustrated) may properly control an operation of the bypass valve 18 by using the temperature of the EGR gas measured by the temperature sensor 37.

When the first heat exchange core 21 that is an EGR gas boiler is damaged, the working fluid is leaked, and when the leaked working fluid is introduced into a combustion chamber of the engine together with the EGR gas, the engine may become disharmonious or may be damaged in a bad situation. To prevent this, a gas leakage detecting sensor 38 may be installed at a location (for example, the downstream side pipe 19) that is adjacent to the outlet port 13 of the housing 11, and the control unit (not illustrated) may be connected to the leakage detecting sensor 38.

The gas leakage detecting sensor 38 may detect leakage of the working fluid (a coolant or ethanol) when the first heat exchange core 21 that is an EGR gas boiler is damaged, and accordingly, if the gas leakage detecting sensor 38 detects leakage of air, the control unit (not illustrated) may prevent the working fluid from being introduced into the engine as the bypass valve 18 is moved to the third location (see FIG. 21) where the downstream side pipe 19 is closed.

Referring to FIGS. 2 to 18, the heat exchanger 10 for a vehicle according to an embodiment of the present disclosure may include a housing 11.

Figure 4:
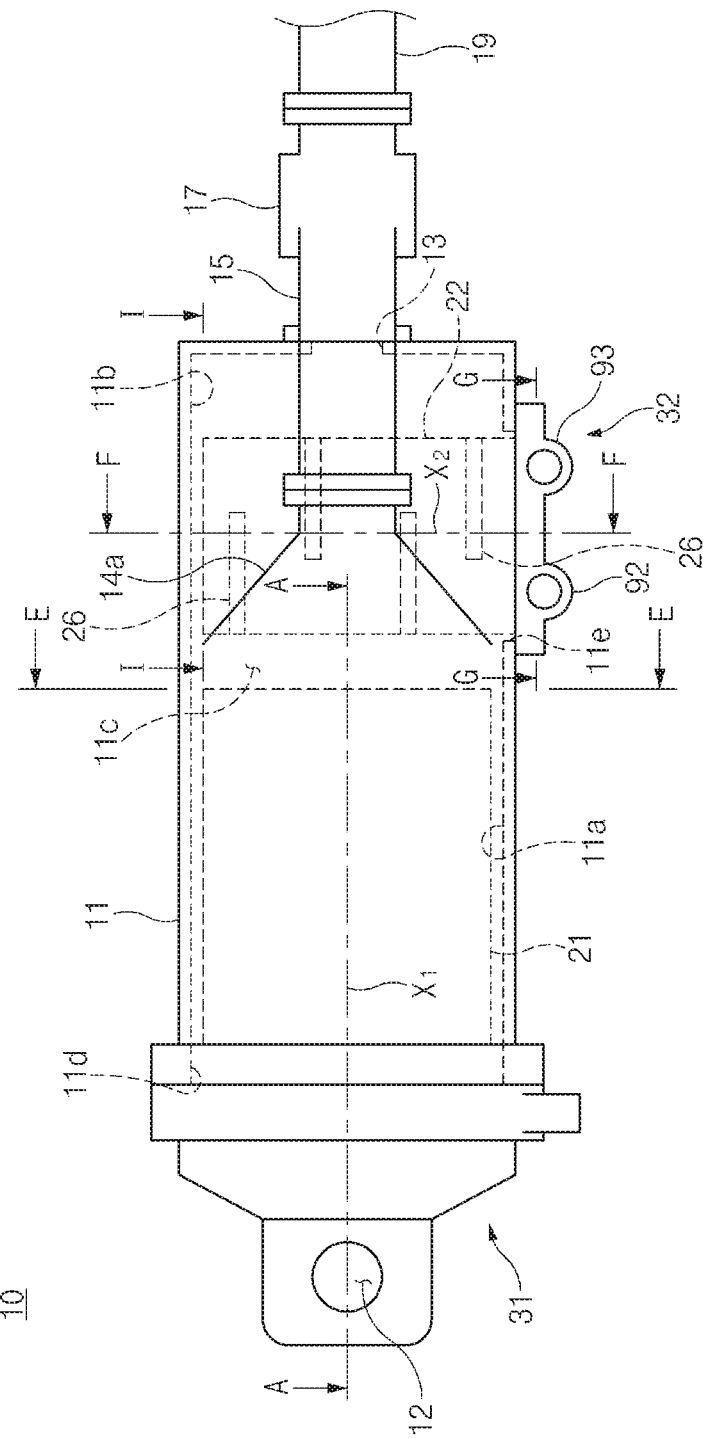
FIG. 4 is a plan view illustrating the heat exchanger for a vehicle according to an embodiment of the present disclosure.

Referring to FIG. 4, the housing 11 may have interior spaces 11a, 11b, and 11c through which the EGR gas passes. A first opening 11d may be formed at one end of the housing 11, and a second opening 11e may be formed in one side wall of the housing 11. Accordingly, the first opening 11d and the second opening 11e may be formed at locations at which they are perpendicular to each other.

A first header 31 may be installed in the first opening 11d of the housing 11 to be sealed, the first heat exchange core 21 may be connected to the first header 31, a second header 32 may be installed in the second opening 11e of the housing 11 to be sealed, and the second heat exchange core 22 may be connected to the second header 32.

Further, because the first opening 11d and the second opening 11e of the housing 11 are formed at locations at which they are perpendicular to each other, the axis X1 of the first heat exchange core 21 and the axis X2 of the second heat exchange core 22 may be perpendicular to each other as illustrated in FIG. 4.

The first heat exchange core 21 may be installed in the upstream side interior space 11a that is adjacent to the first header 31 of the housing 11.

Figure 5:
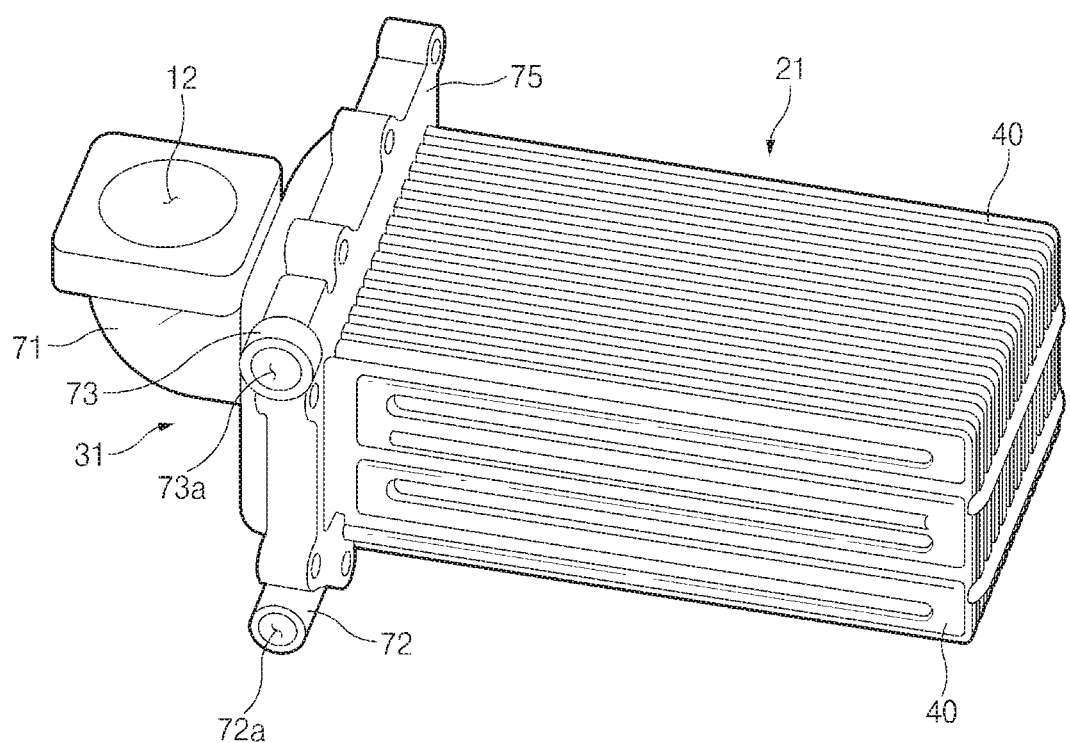
FIG. 5 is a perspective view illustrating a first heat exchange core separated from the heat exchanger for a vehicle according to an embodiment of the present disclosure.

Referring to FIG. 5, the first heat exchange core 21 may include a plurality of first core elements 40, and the plurality of first core elements 40 may be stacked horizontally. As the plurality of first core elements 40 are spaced apart from each other as illustrated in FIG. 9, a first EGR gas passage 61, through which the EGR gas passes, may be formed between the adjacent first core elements 40.

Figure 9:
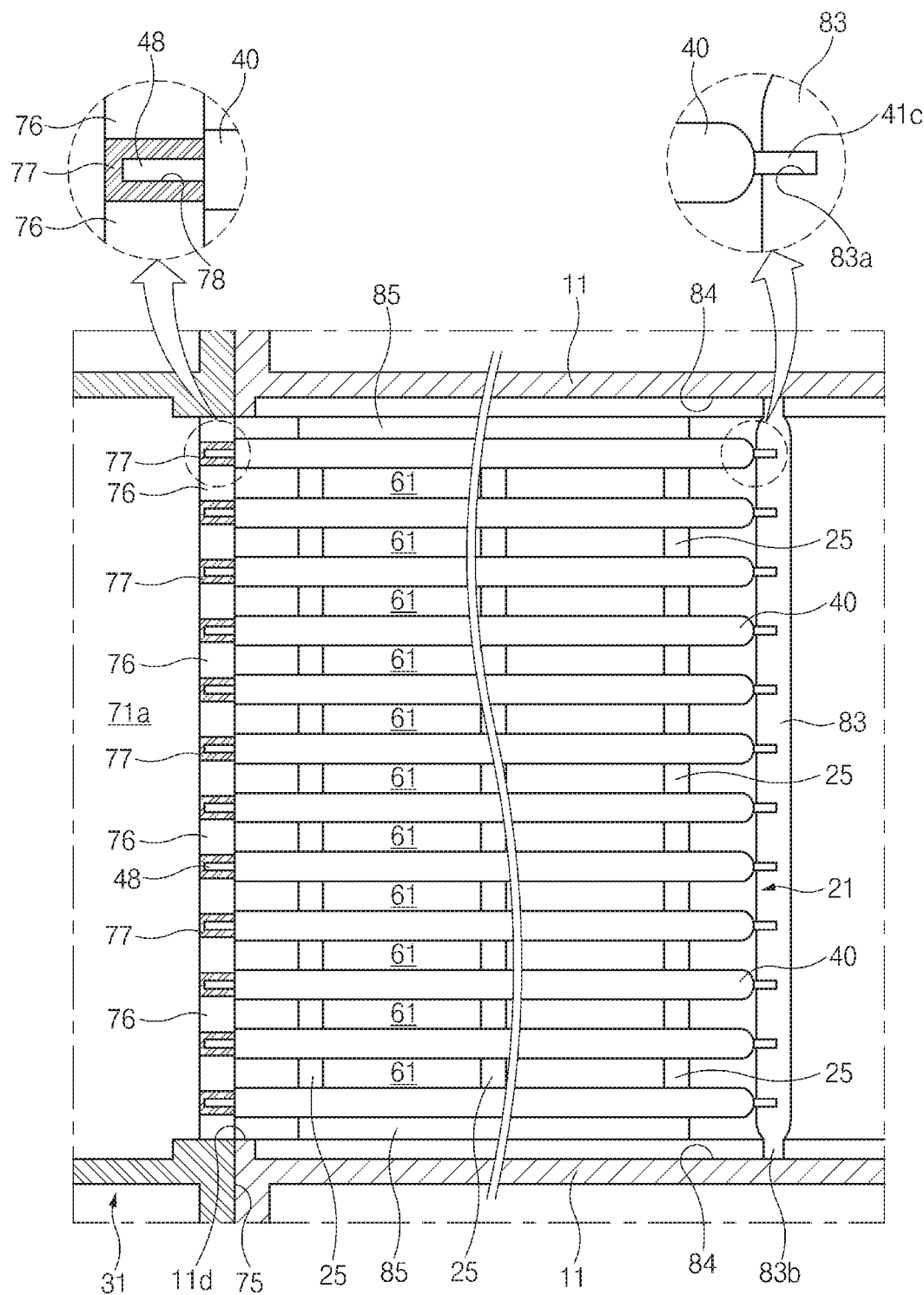
FIG. 9 is a sectional view taken along line D-D of FIG. 3.

As illustrated in FIG. 5, the first core elements 1 may be installed vertically uprights, and accordingly, as illustrated in FIG. 9, the first core elements 1 may be horizontally spaced apart from each other.

The second heat exchange core 22 may be installed in the downstream side interior space 11b that is adjacent to the second header 32 of the housing 11.

Figure 11:
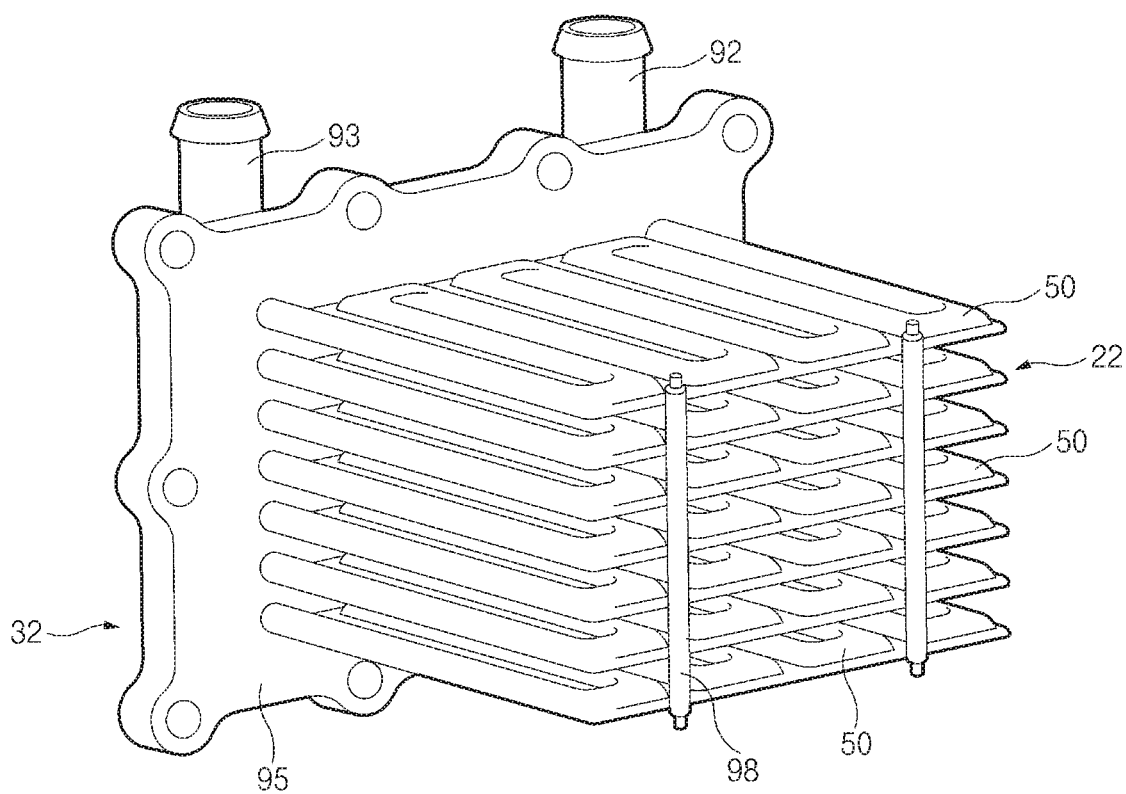
FIG. 11 is a perspective view illustrating a second heat exchange core separated from the heat exchanger for a vehicle according to an embodiment of the present disclosure.
Figure 12:
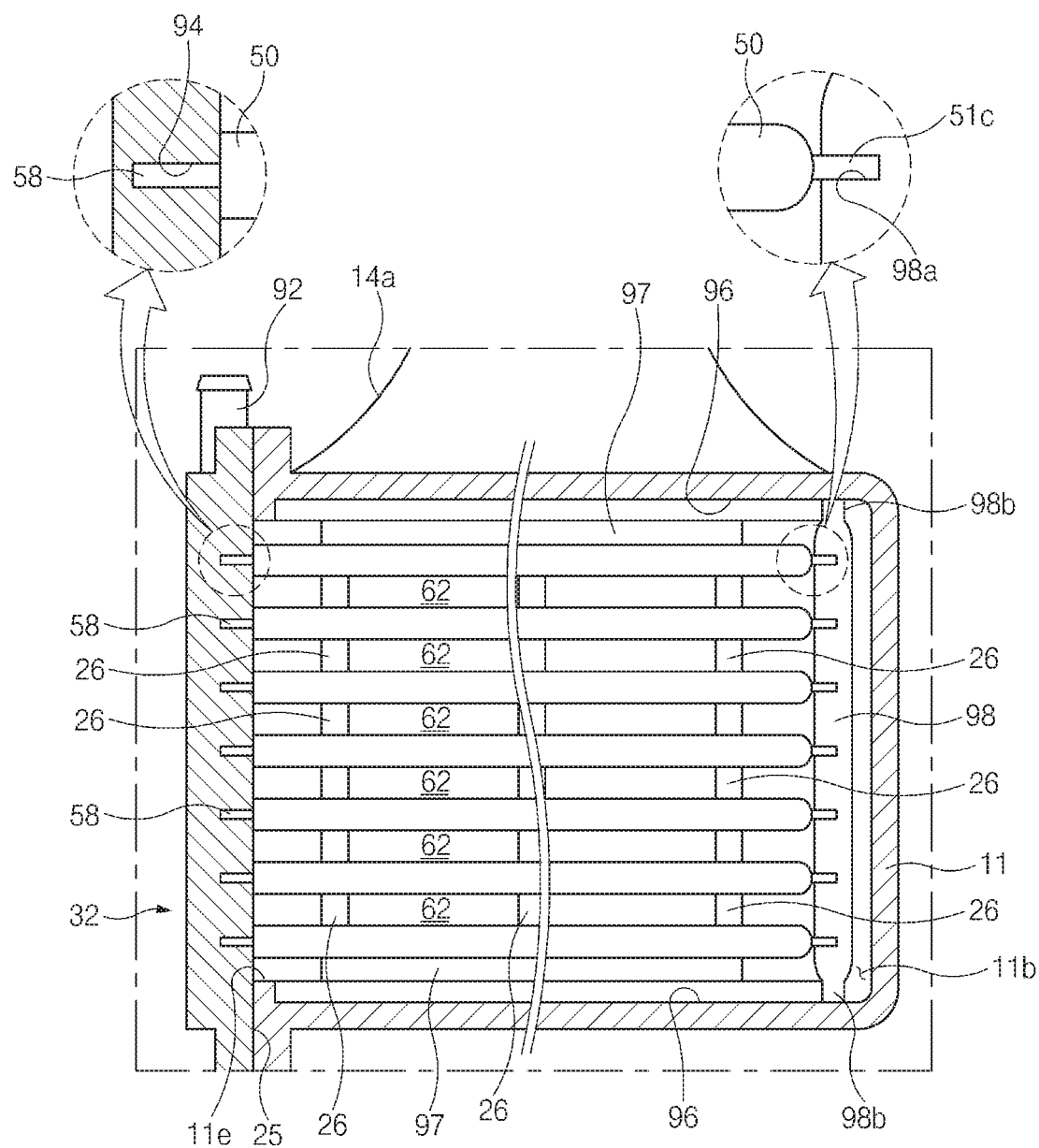
FIG. 12 is a sectional view taken along line F-F of FIG. 4.

Referring to FIG. 11, the second heat exchange core 22 may include a plurality of second core elements 50, and the plurality of second core elements 50 may be stacked vertically. As the plurality of second core elements 50 are spaced apart from each other as illustrated in FIG. 12, a second EGR gas passage 62, through which the EGR gas passes, may be formed between the adjacent second core elements 50.

As illustrated in FIG. 4, the first heat exchange core 21 and the second heat exchange core 22 may be spaced apart from each other in the housing 11, and accordingly, a spacing space 11c may be formed between the first heat exchange core 21 and the second heat exchange core 22.

Figure 2:
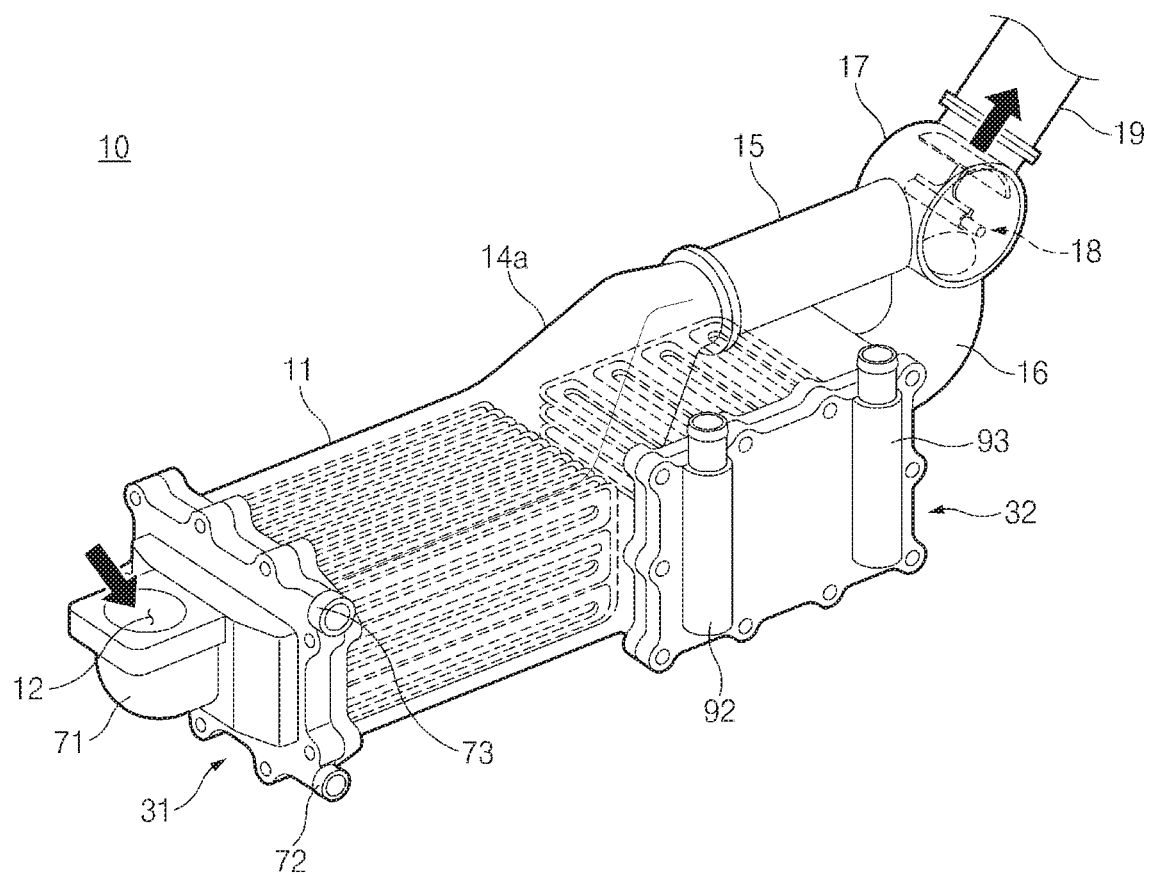
FIG. 2 is a perspective view illustrating the heat exchanger for a vehicle according to an embodiment of the present disclosure.
Figure 3:
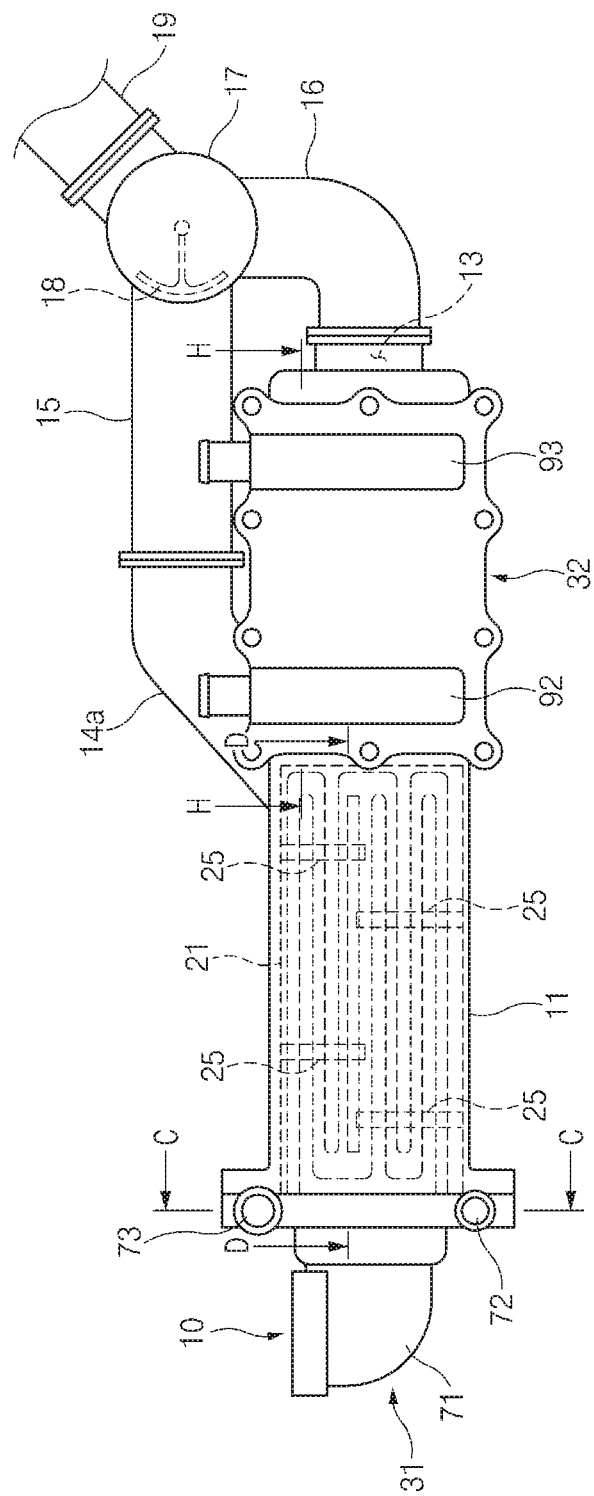
FIG. 3 is a side view illustrating the heat exchanger for a vehicle according to an embodiment of the present disclosure.

As illustrated in FIGS. 2 to 4, a bypass connection member 14a may be formed in the bypass port 14 of the housing 11 as a single body, and the bypass conduit 15 may be connected to the bypass connection member 14a.

The bypass conduit 15 may be connected to the bypass port 14 of the housing 11. One end of the bypass conduit 15 may communicate with the spacing space 11c, and an opposite end of the bypass conduit 15 may merge with the connection conduit 16 of the housing 11 to form a merging part 17. The bypass valve 18 may be installed in the merging part 17, and the flow direction of the EGR gas may be changed by an operation of the bypass valve 18.

As illustrated in FIG. 11, the second core elements 50 may be laid down horizontally, and accordingly, the second core elements 50 may be spaced apart from each other vertically. Accordingly, as illustrated in FIGS. 3 and 4, the EGR gas passing through the interior of the housing 11 may further increase a contact area (heat exchange area) between the first core elements 40 and the second core elements 50 by arranging the first core elements 40 and the second core elements 50 in directions that are perpendicular to each other as illustrated in FIGS. 3 and 4.

Figure 6:
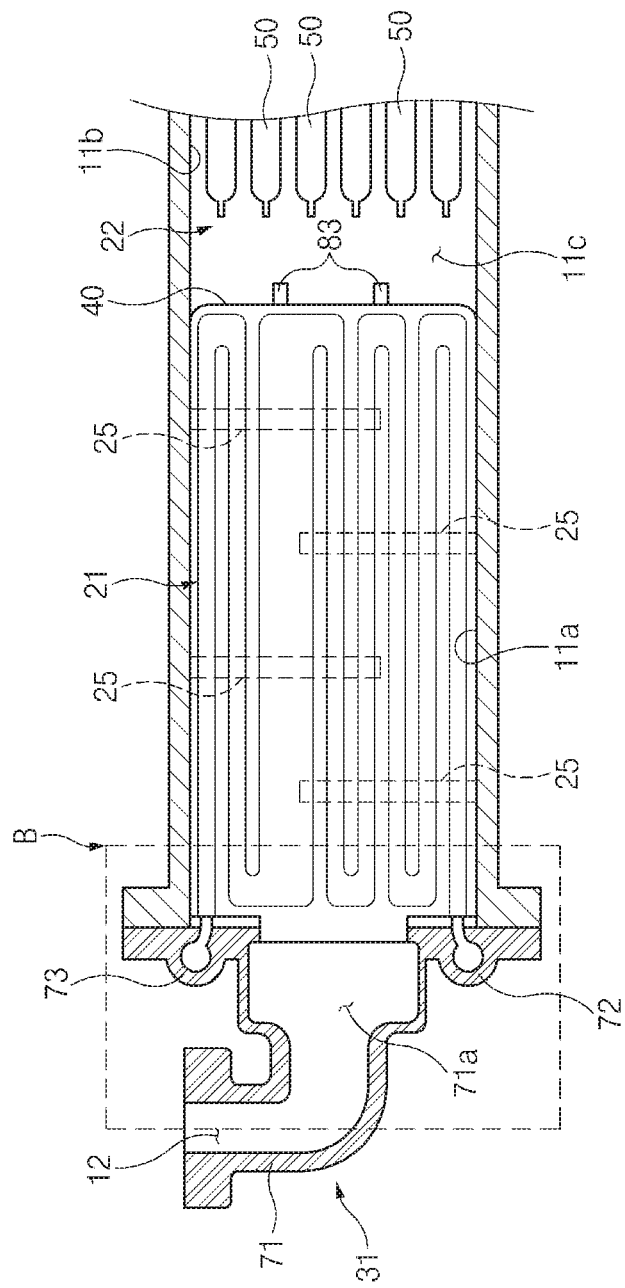
FIG. 6 is a sectional view taken along line A-A of FIG. 4.

As illustrated in FIGS. 5 and 6, the first header 31 may include an EGR gas inlet manifold 71, a working fluid inlet manifold 72, a working fluid outlet manifold 73, and a back end wall 75, to which the first heat exchange core 21 is coupled.

The EGR gas inlet manifold 71, the working fluid inlet manifold 72, and the working fluid outlet manifold 73 may be integrally provided at a front portion of the first header 31.

An end wall 75 is formed at a back portion of the header 31, and the end wall 75 may close the first opening 11c of the housing 11 such that the first opening 11c of the housing 11 may be sealed.

The inlet port 12, through which the EGR gas is introduced, may be formed at an end of the EGR gas inlet manifold 71, and the EGR gas distribution chamber 71a communicating with the inlet port 12 may be formed in the interior of the EGR gas inlet manifold 71. In this way, because the EGR gas may be preliminarily cooled by the working fluid as the EGR gas distribution chamber 71a is formed in the first header 31 unitarily together with the working fluid inlet manifold 72 and the working fluid outlet manifold 73, the cooling efficiency of the EGR gas may be improved.

As illustrated in FIGS. 6 to 9, the end wall 75 may be formed at a back portion of the first header 31, and the end wall 75 may close the opening 11c of the housing 11. A plurality of communication apertures 76 communicating with the EGR gas distribution chamber 71a may be formed in the end wall 75, and the plurality of communication apertures 76 may be spaced apart from each other along a horizontal direction. The communication apertures 76 may extend from the end wall 75 in a vertical direction. As illustrated in FIG. 9, the communication apertures 76 may be configured to communicate with a plurality of first EGR gas passages 61 formed between the first core elements 40. Accordingly, the EGR gas introduced through the inlet port 12 may pass through the plurality of first EGR gas passages 61 after being distributed to the plurality of communication apertures 76 through the EGR gas distribution chamber 71a.

Figure 7:
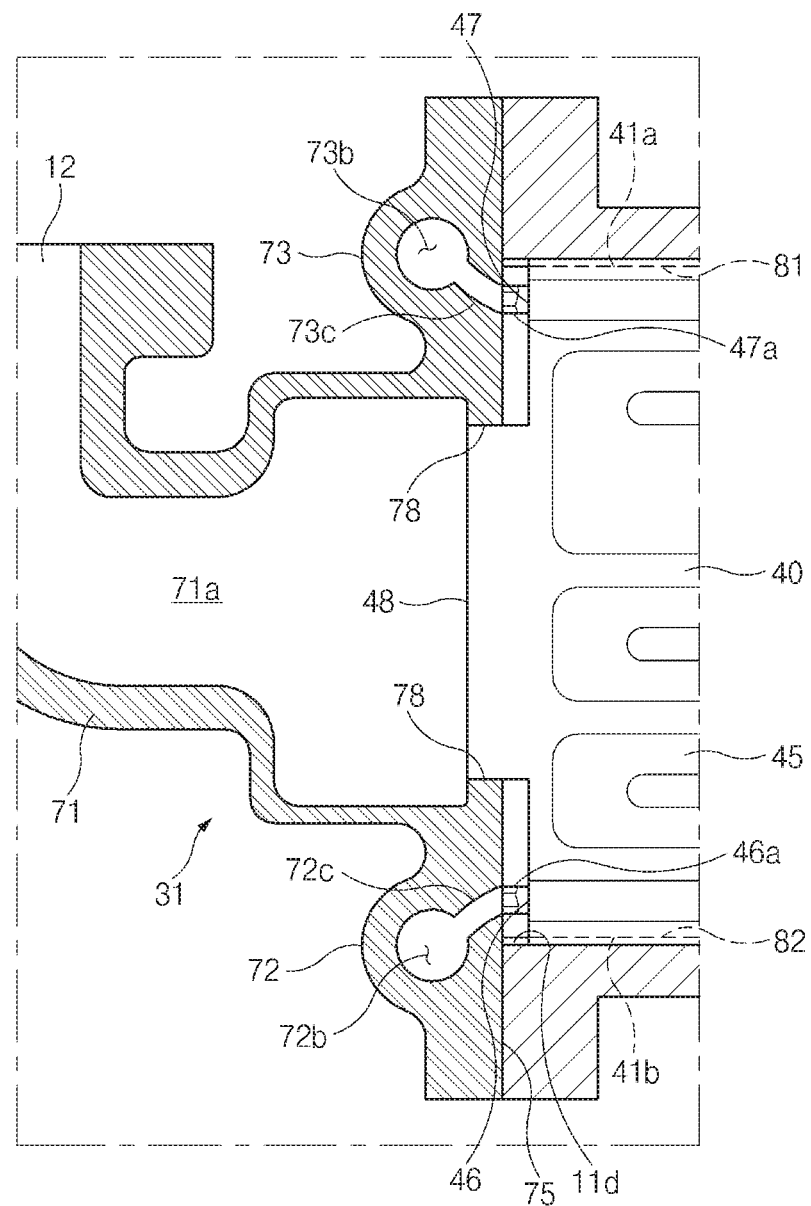
FIG. 7 is an enlarged view of a portion of arrow B of FIG. 6.
Figure 8:
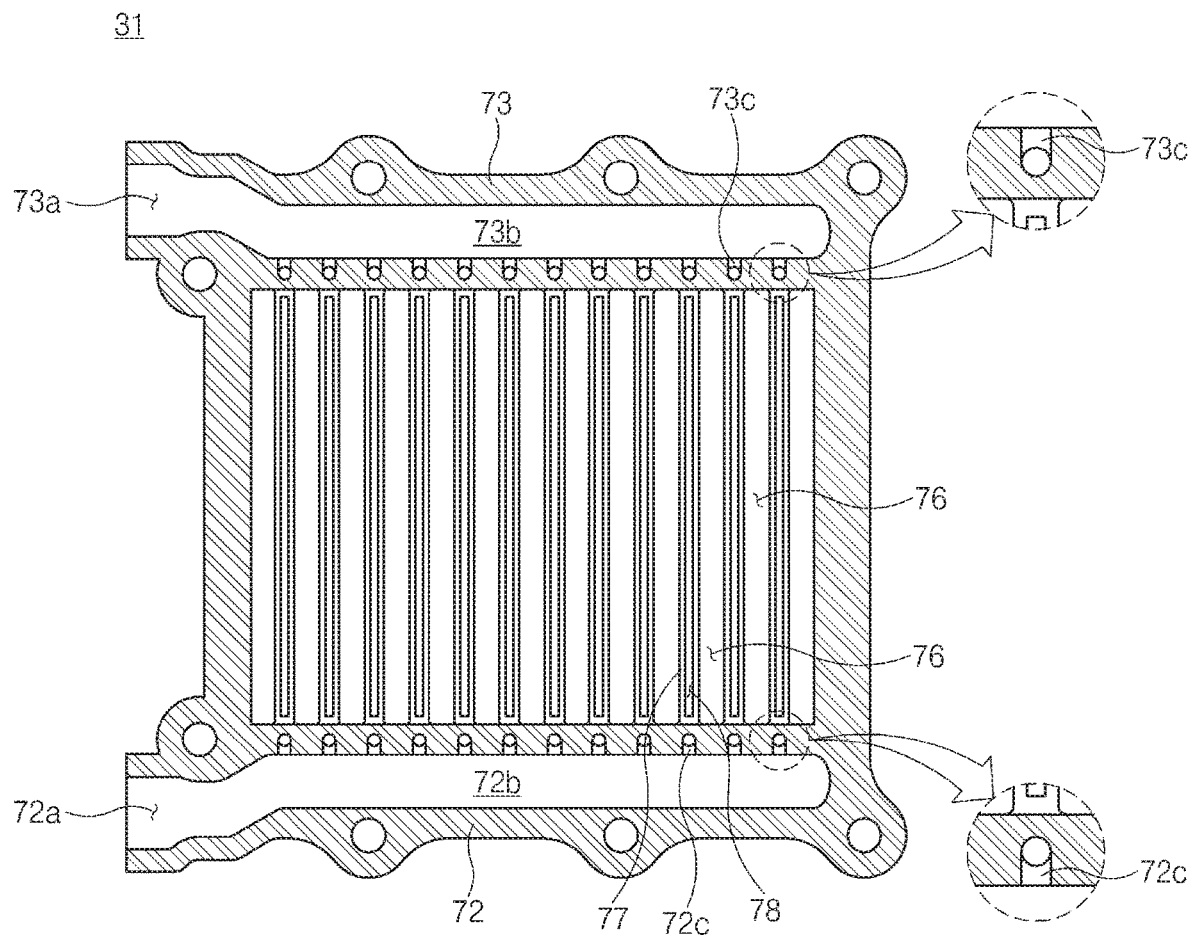
FIG. 8 is a sectional view taken along line C-C of FIG. 3.

As illustrated in FIGS. 6 and 7, as the plurality of communication apertures 76 may be formed in the end wall 75 to be spaced apart from each other by a specific interval, a plurality of ribs 77 may be formed between the communication apertures 76. The plurality of ribs 77 may extend in a vertical direction. A plurality of insertion recesses 78 may be individually formed in the plurality of ribs 77, and accordingly, as illustrated in FIGS. 6 and 7, the plurality of insertion grooves 78 and the plurality of communication apertures 76 may be alternately formed. The plurality of first core elements 40 may be individually inserted into and coupled to the plurality of insertion grooves 78. The insertion grooves 78 may extend in a vertical direction, and the plurality of insertion grooves 78 may be spaced apart from each other by a specific interval along a horizontal direction.

As illustrated in FIGS. 7 and 9, a working fluid inlet port 72a, through which the working fluid is introduced, may be formed at an end of the working fluid inlet manifold 72. As illustrated in FIGS. 7 and 9, a working fluid inlet chamber 72b communicating the working fluid inlet port 72a may be formed in the interior of the working fluid inlet manifold 72. As illustrated in FIG. 9, a plurality of communication passages 72c communicating with the working fluid inlet chamber 72b may be formed in the end wall 75. Accordingly, the working fluid introduced through the working fluid inlet port 72a may be introduced into inlets 46 of the first core elements 40 after being distributed to the plurality of communication passages 72c through the working fluid inlet chamber 72b.

As illustrated in FIGS. 7 and 9, a working fluid outlet port 73a, through which the working fluid is discharged, may be formed at an end of the working fluid outlet manifold 73. As illustrated in FIGS. 7 and 9, a working fluid outlet chamber 73b communicating the working fluid outlet port 73a may be formed in the interior of the working fluid outlet manifold 73. As illustrated in FIG. 9, a plurality of communication passages 73c communicating with the working fluid outlet chamber 73b may be formed in the end wall 75. Accordingly, the working fluid may be discharged through the working fluid outlet port 73a after merging in the working fluid outlet chamber 73b via the plurality of communication passages 73c at the outlets 47 of the first core elements 40.

In this way, the first core elements 40 of the first heat exchange core 21 may be connected to the working fluid inlet manifold 72 and the working fluid outlet manifold 73 of the first header 31, and accordingly, the working fluid may circulate in the interiors of the first core elements 40 of the first heat exchange core 21.

The first heat exchange core 21 may include a plurality of first core elements 40 connected to the first header 31.

Figure 16:
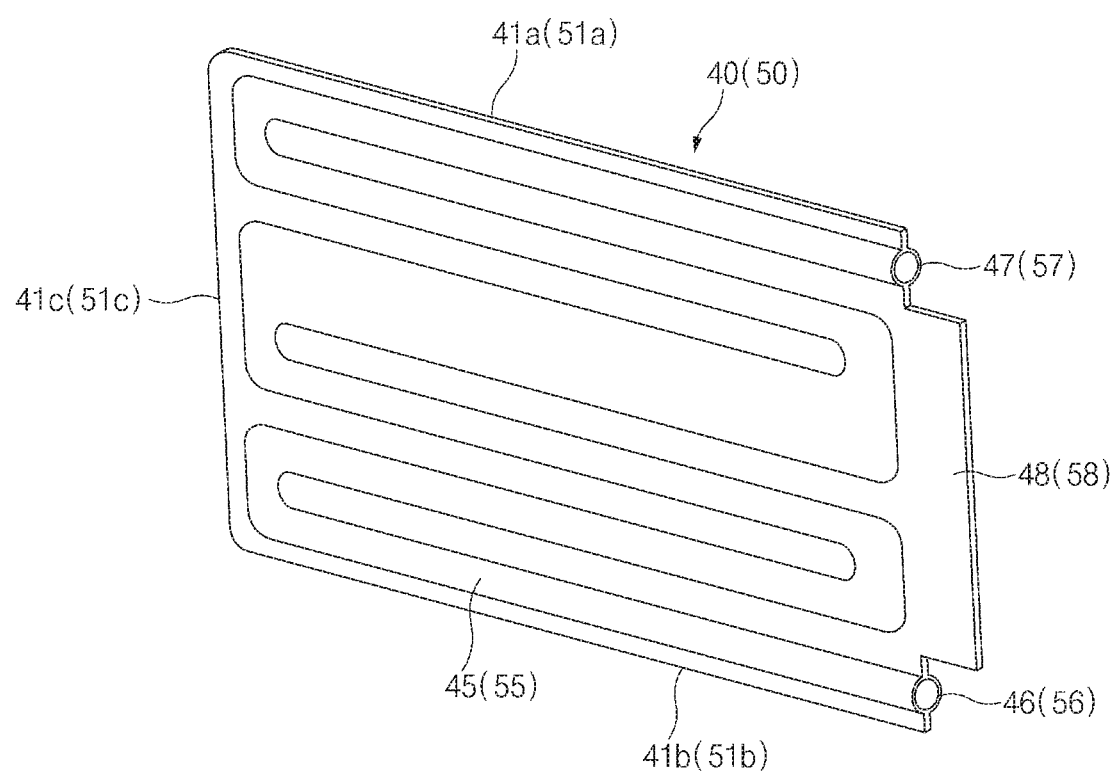
FIG. 16 is a perspective view illustrating first and second core elements according to an embodiment of the present disclosure.
Figure 17:
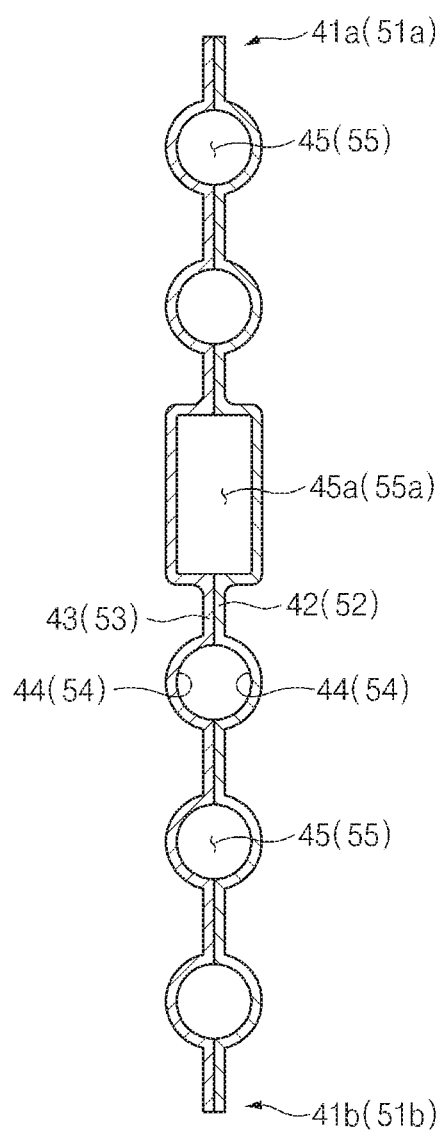
FIG. 17 is a front sectional view illustrating the first and second core elements according to an embodiment of the present disclosure.

Referring to FIGS. 16 and 17, each of the plurality of first core elements 40 may include a passage 45, through which the working fluid circulates. The passage 45 may be formed in a serpentine or reversing path, and accordingly, a heat exchange performance may be improved by enlarging a heat exchange contact area. The passage 45 may have an inlet 46, through which the working fluid is introduced and an outlet 47 through which the working fluid is discharged, the inlet 46 may communicate with the communication passages 72c of the working fluid inlet manifold 72, and the outlet 47 may communicate with the communication passages 73c of the working fluid outlet manifold 73.

As illustrated in FIG. 7, the inlet 46 of the first core element 40 may be connected to the communication passage 72c of the working fluid inlet chamber 72b through a connection piece 46a to communicate with the communication passage 72c of the working fluid inlet chamber 72b. The outlet 47 of the first core element 40 may be connected to the communication passage 73c of the working fluid outlet chamber 73b through a connection piece 47a to communicate with the communication passage 73c of the working fluid outlet chamber 73b.

First EGR gas passages 61, through which the EGR gas passes, may be formed between the adjacent first core elements 40 by spacing the plurality of first core elements 40 apart from each other by a specific interval, and the EGR gas introduced through the inlet port 12 of the housing 11 may be cooled by the working fluid passing through the passage 45 when the EGR gas passes through the first EGR gas passages 61 between the first core elements 40, and accordingly, the working fluid may be vaporized from a liquid phase to a vapor phase.

As illustrated in FIGS. 6 and 9, a plurality of first baffles 25 may be interposed in the first EGR gas passage 61 between the first core elements 40. The first baffles 25 may prevent the first core elements 40 from being distorted or deformed due to internal pressure and thermal deformation. As illustrated in FIG. 6, the plurality of first baffles 25 may be disposed in zigzags when viewed from a side, and accordingly, the cooling efficiency of the EGR gas may be further improved as the working fluid flows in zigzags.

As illustrated in FIG. 9, an insertion boss 48 may be formed at one lengthwise end of the first core element 40, and the insertion boss 48 of the core element 40 may be inserted into and coupled to the insertion groove 78 of the first header 21. Through this, the plurality of first core elements 40 may be spaced apart from each other along a horizontal direction, and accordingly, the first EGR gas passage 61 between the first core elements 1 may be constantly maintained.

Figure 10:
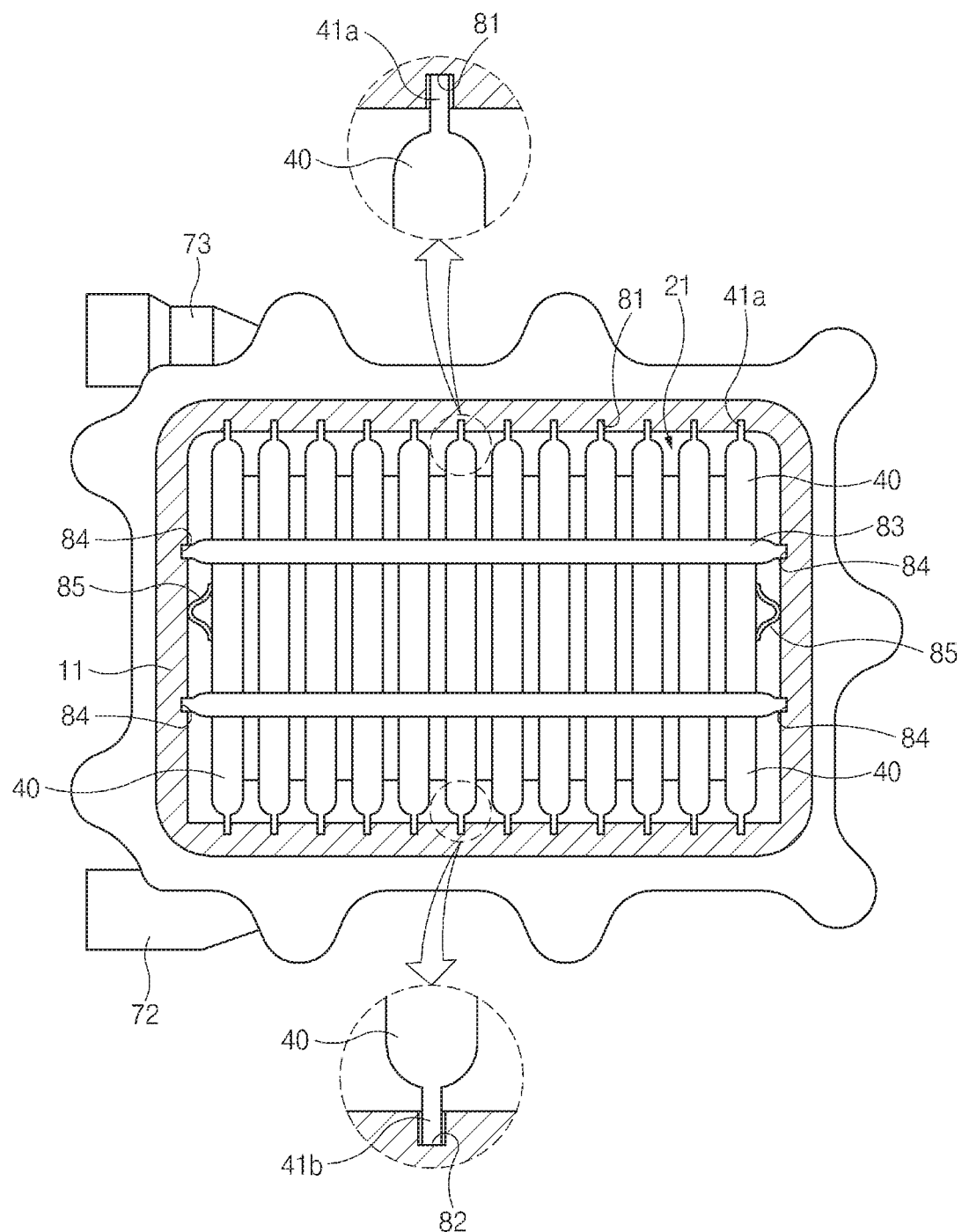
FIG. 10 is a view taken along line E-E of FIG. 4.

As illustrated in FIGS. 7 and 10, an upper end periphery 41b of the first core element 40 may be coupled to a top of the housing 11. A plurality of upper grooves 81 may be formed on the ceiling of the housing 11, and the upper grooves 81 may extend along a lengthwise direction of the housing 11. Accordingly, the upper end peripheries 41a of the first core elements 40 may be inserted into and coupled to the upper grooves 81.

As illustrated in FIGS. 7 and 10, a lower end periphery 41a of the first core element 40 may be detachably coupled to a bottom of the housing 11. A plurality of lower grooves 82 may be formed on the bottom of the housing 11, and the lower grooves 82 may extend along a lengthwise direction of the housing 11. Accordingly, the lower end peripheries 41b of the first core elements 40 may be inserted into and coupled to the lower grooves 82.

In this way, because the lengthwise ends of the first core elements 40 are coupled to the first header 21, the upper ends of the first core elements 40 are coupled to the top of the housing 11, and the lower ends of the first core elements 40 are coupled to the bottom of the housing 11, the first core elements 21 may be installed in the upstream side interior space 11a of the housing 11 very firmly.

Further, the opposite lengthwise ends of the first core elements 40 may be supported by the support member 83. The support member 83 may extend to cross the housing 11 in a widthwise direction of the housing 11, and the support member 83 may connect opposite ends of the first core elements 21 in a widthwise direction of the housing 11.

The support member 83 may have a plurality of grooves 83a spaced apart from each other at a specific interval, and the interval between the grooves 83a of the support member 83 may be the same as the interval between the first core elements 40.

As opposite peripheries 31c of the core elements 31 are inserted into and coupled to the grooves 83a of the support member 83, the opposite end peripheries 41c of the first core elements 40 may be connected to each other in a widthwise direction by the support member 83.

The opposite ends of the support member 83 may be detachably coupled to opposite inner surfaces of the housing 11, and the opposite ends of the first core elements 40 may be stably supported by the housing 11 through the support member 83.

In more detail, as illustrated in FIGS. 9 and 10, side grooves 84 may be formed on opposite inner surfaces of the housing 11, and the side grooves 84 may extend in a lengthwise direction of the housing 11. Further, bosses 83b may be formed at opposite ends of the support member 83, and the bosses 83b of the support member 83 may be coupled to the side grooves 84 of the housing 11.

Because the upper ends and the lower ends of the first core elements 40 are coupled to the top and the bottom of the housing 11, lengthwise ends of the first core elements 40 are coupled to the first header 31, and opposite lengthwise ends of the first core elements 40 are supported by the support member 83, the upper ends, the lower ends, and the lengthwise ends of the first core elements 40 may be firmly supported by the housing 11, and accordingly, the first core elements 40 may be stably supported against vibration, pressure, and thermal deformation and thus the durability of the first core elements 40 may be improved.

Further, because the upper end peripheries 41a and the upper end peripheries 41b of the first core elements 40, and the support member 83 are detachably inserted into and coupled to the housing 11, the first core elements 40 of the first heat exchange core 21 may be easily separated from and assembled in the housing 11, and accordingly, the interior spaces 11a, 11b, and 11c of the housing 11 and the first core elements 40 of the first heat exchange core 21 may be washed very easily.

Further, the first core elements 40 may be elastically supported by two or more elastic members 85. As illustrated in FIGS. 9 and 10, the two or more elastic members 85 may be symmetrically installed on the inner surface of the housing 11, and the elastic members 85 has a leaf spring structure extending in a lengthwise direction of the housing 11, and accordingly, the first core elements 40 may be elastically supported on opposite sides. The plurality of first core elements 40 may be more stably supported against pressure, vibration, and thermal deformation by the elastic elements 85.

As illustrated in FIGS. 11 and 12, the second header 32 may include a coolant inlet manifold 92, a coolant outlet manifold 93, and a back end wall 95, to which the second heat exchange core 22 is coupled.

The coolant inlet manifold 92 and the coolant outlet manifold 93 may be formed at a front portion of the second header 322, an end wall 95 may be formed at a back portion of the second header 32, and the end wall 95 may close the second opening 11e of the housing 11 such that the second opening 11e of the housing 11 may be sealed.

Figure 13:
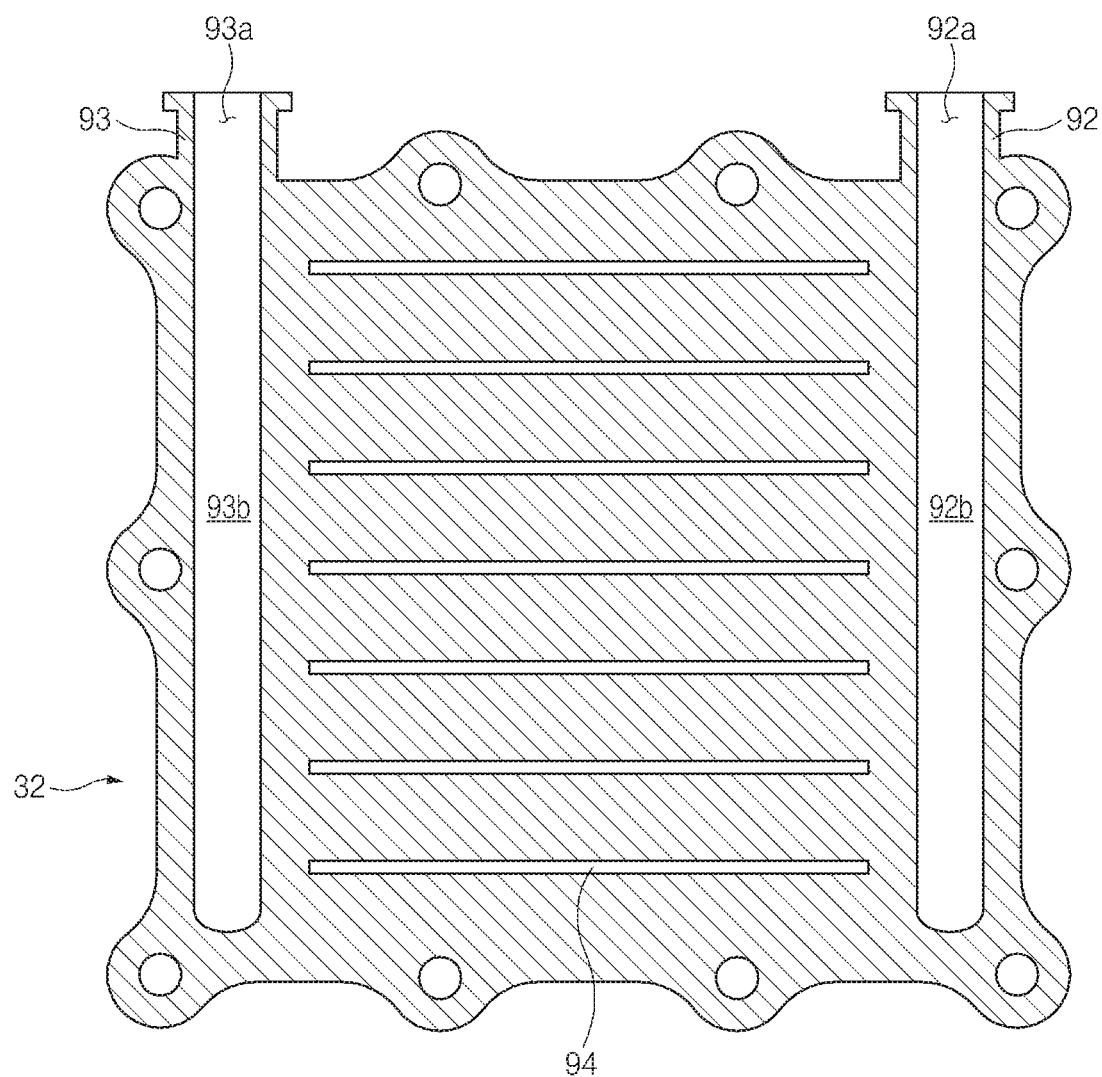
FIG. 13 is a sectional view taken along line G-G of FIG. 4.

As illustrated in FIGS. 12 to 13, the end wall 95 may be formed at a back portion of the second header 32, and the end wall 95 may close the second opening 11e of the housing 11. A plurality of insertion grooves 94 may be individually formed in the end wall 95, the plurality of insertion grooves 94 may extend horizontally, and the plurality of insertion grooves 94 may be spaced apart from each other vertically at a specific interval.

Figure 14:
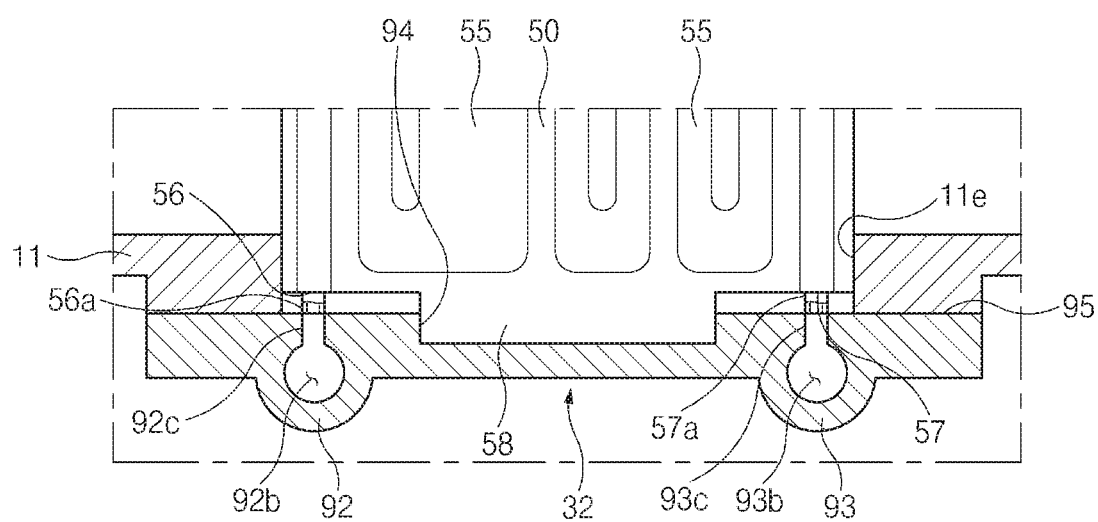
FIG. 14 is a sectional view taken along line H-H of FIG. 3.

As illustrated in FIGS. 12 to 14, a coolant inlet port 92a, through which the coolant fluid is introduced, may be formed at an end of the coolant inlet manifold 92. A coolant inlet chamber 92b communicating with the coolant fluid inlet port 92a may be formed in the interior of the coolant inlet manifold 92. As illustrated in FIG. 14, a plurality of communication passages 92c communicating with the coolant inlet chamber 92b may be formed in the end wall 95. Accordingly, the coolant fluid introduced through the coolant inlet port 92a may be introduced into inlets 56 of the second core elements 50 after being distributed to the plurality of communication passages 92c through the coolant inlet chamber 92b.

As illustrated in FIGS. 12 and 14, a coolant outlet port 93a, through which the coolant fluid is discharged, may be formed at an end of the coolant outlet manifold 93. A coolant outlet chamber 93b communicating with the coolant outlet port 93a may be formed in the interior of the coolant outlet manifold 93. As illustrated in FIG. 14, a plurality of communication passages 93c communicating with the coolant outlet chamber 93b may be formed in the end wall 95. Accordingly, the coolant fluid may be discharged through the coolant outlet port 93a after merging in the working outlet chamber 93b via the plurality of communication passages 93c at the outlets 57 of the second core elements 50.

In this way, the second core elements 50 of the second heat exchange core 22 may be connected to the coolant inlet manifold 92 and the coolant outlet manifold 93 of the second header 32, and accordingly, the coolant fluid may circulate in the interiors of the second core elements 50 of the second heat exchange core 22.

The second heat exchange core 22 may include a plurality of second core elements 50 connected to the second header 32.

Referring to FIGS. 16 and 17, each of the plurality of second core elements 50 may include a passage 55, through which the coolant fluid circulates. The passage 55 may be formed in a serpentine or reversing path, and accordingly, a heat exchange performance may be improved by enlarging a heat exchange contact area. The passage 55 may have an inlet 56, through which the coolant fluid is introduced and an outlet 57, through which the coolant fluid is discharged, the inlet 56 may communicate with the communication passage 92c of the coolant inlet manifold 92, and the outlet 57 may communicate with the communication passage 93 of the coolant outlet manifold 93.

As illustrated in FIG. 14, the inlet 56 of the second core element 50 may be connected to the communication passage 72c of the coolant inlet chamber 72b through a connection piece 56a to communicate with the communication passage 72c of the coolant inlet chamber 72b. The outlet 57 of the second core element 50 may be connected to the communication passage 93c of the coolant outlet chamber 93b through a connection piece 57a to communicate with the communication passage 93c of the coolant outlet chamber 93b.

As the plurality of second core elements 50 are spaced apart from each other, a second EGR gas passage 62, through which the EGR gas passes, may be formed between the adjacent second core elements 50. The EGR gas introduced through the inlet port 12 of the housing 11 may pass through the second EGR gas passages 62 between the second core elements 50, and the EGR gas passing through the second EGR gas passages 62 may be cooled by the coolant fluid passing through the passages 55 of the second core elements 50, and accordingly, the temperature of the coolant fluid may be increased.

As illustrated in FIGS. 4 and 12, a plurality of second baffles 26 may be interposed in the second EGR gas passage 62 between the second core elements 50. The second baffles 26 may prevent the second core elements 50 from being distorted or deformed due to internal pressure and thermal deformation. As illustrated in FIG. 4, the plurality of second baffles 26 may be disposed in zigzags when viewed from the top, and accordingly, the cooling efficiency of the EGR gas as the coolant fluid flows in zigzags.

As illustrated in FIGS. 11 and 14, an insertion boss 58 may be formed at one lengthwise end of the second core element 50, and the insertion boss 58 of the second core element 50 may be inserted into and coupled to the insertion groove 94 of the second header 22. Through this, the plurality of second core elements 50 may be spaced apart from each other along a vertical direction, and accordingly, the second EGR gas passage between the second core elements 50 may be constantly maintained.

Figure 15:
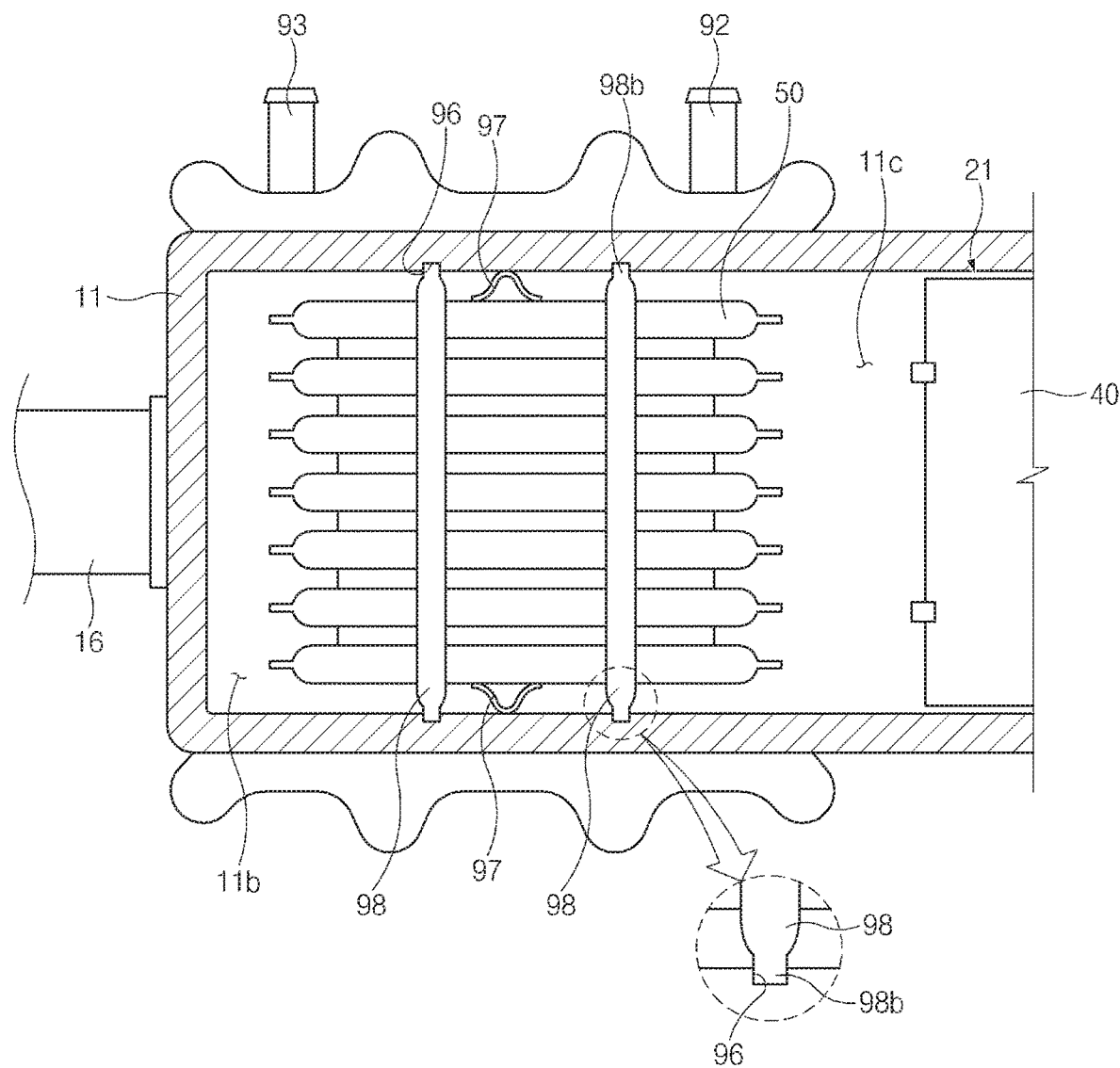
FIG. 15 is a sectional view taken along line I-I of FIG. 4.

As illustrated in FIGS. 11, 12, and 15, the opposite lengthwise ends of the second core elements 50 may be supported by the support member 98. The support member 95 may extend to cross the housing 11 in a lengthwise direction of the housing 11, and the support member 98 may connect opposite ends of the second core elements 50 in a widthwise direction of the housing 11.

The support member 98 may have a plurality of grooves 98a spaced apart from each other at a specific interval, and the interval between the grooves 98a of the support member 95 may be the same as the interval between the second core elements 50.

As opposite end peripheries 51c of the second core elements 50 are coupled to the grooves 98a of the support member 95, the opposite end peripheries 51c of the second core elements 50 may be connected to each other by the support member 98.

The opposite ends of the support member 95 may be detachably coupled to a top and a bottom of the housing 11, and the opposite ends of the second core elements 50 may be stably supported by the housing 11.

In more detail, as illustrated in FIGS. 12 and 15, side grooves 96 may be formed on the top and the bottom of the housing 11, and the grooves 96 may extend in a widthwise direction of the housing 11. Further, bosses 98b may be formed at opposite ends of the support member 98, and the bosses 98b of the support member 98 may be coupled to the grooves 96 of the housing 11.

Lengthwise ends of the second core elements 50 may be coupled to the second header 32 and opposite lengthwise ends of the second core elements 50 are supported by the support member 98 so that the second core elements 50 may be firmly supported by the downstream side interior spaces 1ib of the housing 11, and accordingly, the second core elements 50 may be stably supported against vibration, internal pressure, and thermal deformation so that the durability may be improved.

Further, because the upper end peripheries 51a and the lower end peripheries 51b of the second core elements 50, and the support member 98 are detachably inserted into and coupled to the housing 11, the first core elements 50 of the second heat exchange core 22 may be easily separated from and assembled in the housing 11, and accordingly, the interior spaces 11a, 11b, and 11c of the housing 11 and the second core elements 50 of the second heat exchange core 22 may be washed very easily.

Further, the first core elements 50 may be elastically supported by two or more elastic members 97. As illustrated in FIGS. 13 and 10, the two or more elastic members 97 may be symmetrically installed on the inner surface of the housing 11, and the elastic members 97 has a leaf spring structure extending in a lengthwise direction of the second core elements 50, and accordingly, the second core elements 50 may be elastically supported on upper and lower sides. The plurality of second core elements 50 may be more stably supported against pressure, vibration, and thermal deformation by the elastic elements 97.

Referring to FIGS. 16 and 17, each of the first and second core elements 40 and 50 may include a pair of opposing half shells 42, 43, 52, and 53, and the pair of half shells 42, 43, 52, and 53 may be jointed together through welding or the like. Each of the half shells 42, 43, 52, and 53 may have grooves 44 for forming passages 52.

According to an embodiment of the present disclosure, the coolant passages 45 and 55 may have a circular section, and accordingly, the pressure-resistant performance of the coolant passages 45 and 55 may be improved.

According to an embodiment of the present disclosure, the coolant passage 45a and 55a of portions of the coolant passages 45 and 55 may have a flat rectangular cross-section and the rectangular cross-section may have rounded corners.

Figure 18:
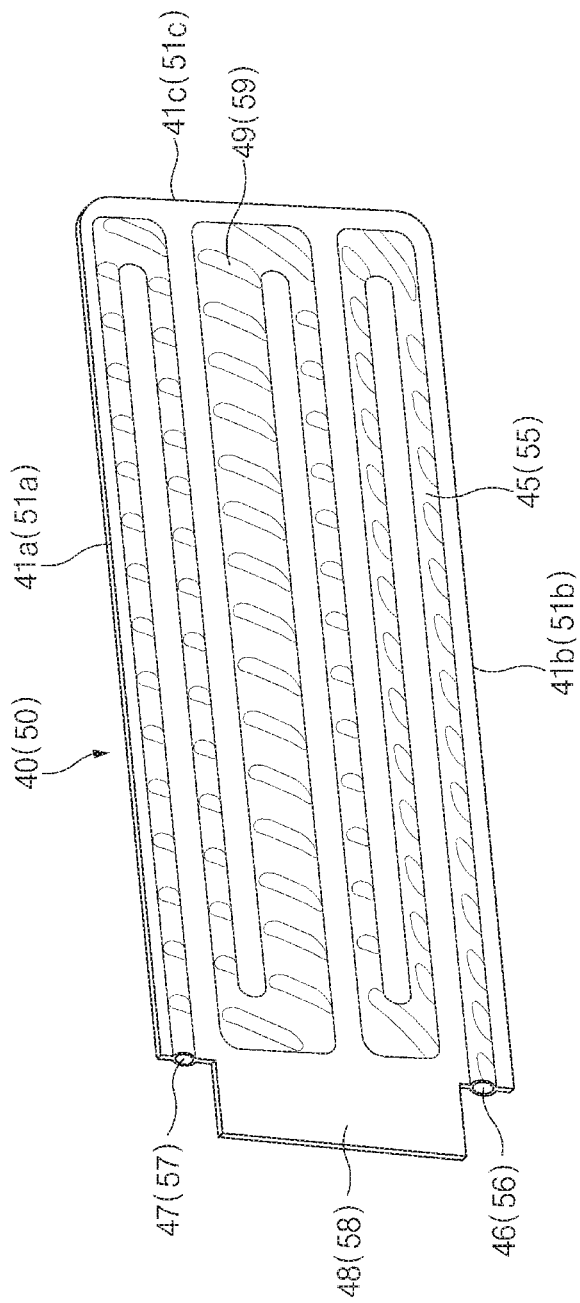
FIG. 18 is a perspective view illustrating first and second core elements according to another embodiment of FIG. 15.

According to another embodiment of the present disclosure, as illustrated in FIG. 18, beads 49 and 59 having a specific shape may be formed on outer surfaces of a portion at which the passages 45 and 55 is formed, and accordingly, heat exchanger performance may be further improved.

If the bypass valve 18 is moved to the first location where the downstream end of the second heat exchange core 22 is closed in a low load condition of the engine or at a low exterior temperature as illustrated in FIG. 19, the EGR gas may bypass (detour) the second heat exchange core 22 as the EGR gas passes through the bypass conduit 15 after passing through the first heat exchange core 21.

Because the temperature of the EGR gas introduced into the inlet of the housing 11 is about 400° C. in a high load condition of the engine or at a high exterior temperature so that the EGR gas has to be properly cooled, the EGR gas has to pass through the second heat exchange core 22 as well as the first heat exchange core 21. As illustrated in FIG. 20, if the bypass valve 18 is moved to the second location where the bypass conduit 15 is closed, the EGR gas may pass through the first heat exchange core 21 and the second heat exchange core 22, and accordingly, a target cooling temperature of the EGR gas may be lowered to about not more than 140° C.

If the gas leakage detecting sensor 38 detects that the first heat exchange core 21 that is an EGR gas boiler is damaged and the EGR gas (a refrigerant or ethanol) is leaked, the engine may become disharmonious or may be severely damaged when the EGR gas is leaked and is introduced into the combustion chamber of the engine together with the EGR gas. As illustrated in FIG. 21, if the bypass valve 18 is moved to the third location where the downstream side pipe 19 is closed, the leaked working fluid may be prevented from being introduced into the combustion chamber of the engine.

According to an embodiment of the present disclosure, as illustrated in FIG. 1, a washing water injection hole 33 for injecting washing water may be formed on one side of the housing 11, a washing water discharge hole 34 for discharging the washing water may be formed on an opposite side of the housing 11, a washing water injection pipe 36a may be connected to the washing water injection hole 33, a washing water discharge pipe 36b may be connected to the washing water discharge hole 34, and the washing water injection pipe 36a and the washing water discharge pipe 36b may be connected to a washing water pump 35. Because the washing water is injected into the interior spaces 11a, 11b, and 11c of the housing 11 through the washing water injection structure, the particulate matters of the EGR gas attached to the core elements 40 and 50 of the heat exchange cores 21 and 22 may be easily washed, and accordingly, the heat transfer performance may be improved.

According to the present disclosure, the first heat exchange core 21 and the second heat exchange core 22 may be arranged along a flow direction of the EGR gas and the flow direction of the EGR gas may be converted such that the EGR gas may selectively detour the second heat exchange core 22 according to the driving condition or the exterior temperature of the vehicle, and accordingly, the EGR gas may be efficiently used.

Although the detailed embodiment of the present disclosure has been described until now, the present disclosure is not limited to the embodiment disclosed in the specification and the accompanying drawings, and the present disclosure may be variously modified by those skilled in the art without departing from the technical spirit of the present disclosure.

What is claimed is:

1. A heat exchanger for a vehicle comprising:
   a housing having an interior space through which exhaust gas recirculation (EGR) gas passes;
   a first heat exchange core disposed in the interior space of the housing;

a second heat exchange core disposed in the interior space of the housing and disposed on a downstream side of the first heat exchange core in a flow direction of the EGR gas; and a bypass valve configured to allow the EGR gas to selectively detour the second heat exchange core, wherein a spacing space is formed between a downstream end of the first heat exchange core in the flow direction of the EGR gas and an upstream end of the second heat exchange core in the flow direction of the EGR gas, and wherein a temperature sensor is installed in the spacing space.

2. The heat exchanger of claim 1, wherein the first heat exchange core and the second heat exchange core are disposed in the housing along the flow direction of the EGR gas.

3. The heat exchanger of claim 1, wherein a bypass conduit is connected to the spacing space, and the bypass valve is installed in the bypass conduit.

4. The heat exchanger of claim 3, wherein the bypass valve is configured to move selectively to a first location where the EGR gas passes through the bypass conduit, a second location where the EGR gas passes through the second heat exchange core, and a third location where the EGR gas is interrupted from being supplied to an engine.

5. The heat exchanger of claim 1, wherein the first heat exchange core is an EGR gas boiler through which a working fluid of a Rankine cycle of a waste heat recovery system circulates.

6. The heat exchanger of claim 5, wherein the first heat exchange core is connected to a first header, and the first header is configured to close a first opening formed W in the housing.

7. The heat exchanger of claim 6, wherein the first header includes an EGR gas inlet manifold through which the EGR gas is introduced, a working fluid inlet manifold through which the working fluid is introduced, and a working fluid outlet manifold through which the working fluid is discharged.

8. The heat exchanger of claim 7, wherein the first heat exchange core includes a plurality of first core elements, each of which has a passage through which the working fluid circulates, and wherein a plurality of first EGR gas passages, through which the EGR gas passes, are formed as the plurality of first core elements are spaced apart from each other.

9. The heat exchanger of claim 8, wherein a gas of leakage detecting sensor configured to detect leakage of the working fluid is installed at a location adjacent to an outlet port of the housing.

10. The heat exchanger of claim 1, wherein the second heat exchange core is an EGR cooler, to which a coolant conduit through which coolant fluid circulates is connected.

11. The heat exchanger of claim 10, wherein the second heat exchange core is connected to a second header, and the second header is configured to close a second opening formed in the housing.

12. The heat exchanger of claim 11, wherein the second header includes a coolant inlet manifold through which the coolant fluid is introduced, and a coolant outlet manifold through which the coolant fluid is discharged.

13. The heat exchanger of claim 12, wherein the second heat exchange core includes a plurality of second core elements, each of which has a passage through which the coolant fluid circulates, and wherein a plurality of second EGR gas passages, through which the EGR gas passes, are formed as the plurality of second core elements are spaced apart from each other.

14. The heat exchanger of claim 1, wherein an axis of the first heat exchange core is perpendicular to an axis of the second heat exchange core.

* * * * *